US010465421B2

(12) United States Patent
Webb et al.

(10) Patent No.: US 10,465,421 B2
(45) Date of Patent: Nov. 5, 2019

(54) ACCESS CONTROL DEVICES OF THE ELECTROMAGNETIC LOCK MODULE TYPE

(71) Applicant: Hanchett Entry Systems, Inc., Phoenix, AZ (US)

(72) Inventors: Michael A. Webb, Cave Creek, AZ (US); Larry Gene Corwin, Phoenix, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 0 days.

(21) Appl. No.: 16/130,697

(22) Filed: Sep. 13, 2018

(65) Prior Publication Data

US 2019/0010730 A1 Jan. 10, 2019

Related U.S. Application Data

(62) Division of application No. 15/472,406, filed on Mar. 29, 2017, now Pat. No. 10,077,577, which is a (Continued)

(51) Int. Cl.
*H01H 47/00* (2006.01)
*E05B 47/00* (2006.01)
(Continued)

(52) U.S. Cl.
CPC ........ *E05B 47/0046* (2013.01); *E05B 17/226* (2013.01); *E05B 41/00* (2013.01); (Continued)

(58) Field of Classification Search
None
See application file for complete search history.

(56) References Cited

U.S. PATENT DOCUMENTS 2,647,325 A 8/1953 Little
4,033,044 A 7/1977 Michaels
(Continued)

FOREIGN PATENT DOCUMENTS

EP 0500197 A1 8/1992
FR 2940997 A3 7/2010
GB 2236139 A 3/1991

OTHER PUBLICATIONS

Nguyen, Tung; CA Patent Application No. 2,790,233; Office Action, dated Jun. 27, 2019, Canadian Intellectual Property Office, Canada.

*Primary Examiner* — Stephen W Jackson
(74) *Attorney, Agent, or Firm* — Dennis B. Danella, Esq.; Ronald J. Kisicki, Esq.; Woods Oviatt Gilman LLP

(57) ABSTRACT

An access control device including an electromagnetic lock module for selectively locking and unlocking a door in a door frame is provided. The access control device provides a lower profiled electromagnetic lock module to improve the aesthetics and functionality of the module, supports and integrates modern accessories such as CCTV, CCD cameras, passive motion detection with automatic background correction, digital notification display, automatic source voltage selection, door and lock status indicators, and ease of installation. The present invention further provides components and circuitry to enable connection of the electromagnetic control module to 12 or 24 volts DC or to an unfiltered rectified AC power supply.

9 Claims, 36 Drawing Sheets

Related U.S. Application Data division of application No. 13/618,806, filed on Sep. 14, 2012, now Pat. No. 9,957,733.

(60) Provisional application No. 61/536,012, filed on Sep. 18, 2011.

(51) Int. Cl.

| | |
|---|---|
| ***G07C 9/00*** | (2006.01) |
| ***E05B 41/00*** | (2006.01) |
| ***E05C 19/16*** | (2006.01) |
| ***H02J 1/00*** | (2006.01) |
| ***E05B 17/22*** | (2006.01) |
| *E05B 17/06* | (2006.01) |

(52) U.S. Cl.

CPC ........ *E05C 19/166* (2013.01); *G07C 9/00722* (2013.01); *G07C 9/00944* (2013.01); *H02J 1/00* (2013.01); *E05B 17/06* (2013.01); *E05B 2047/0048* (2013.01); *E05B 2047/0068* (2013.01); *G07C 2209/62* (2013.01); *Y10T 29/49817* (2015.01); *Y10T 70/5199* (2015.04); *Y10T 70/8973* (2015.04)

(56) References Cited

U.S. PATENT DOCUMENTS

| | | | | | |
|---|---|---|---|---|---|
| 4,257,166 | A | | 3/1981 | Barker et al. | |
| 4,412,137 | A | | 10/1983 | Hansen et al. | |
| 4,538,354 | A | | 9/1985 | Smolik | |
| 4,703,962 | A | | 11/1987 | Kelly et al. | |
| 4,715,125 | A | | 12/1987 | Livick | |
| 4,969,273 | A | | 11/1990 | Richards | |
| 4,989,313 | A | | 2/1991 | Dzurko et al. | |
| 5,000,497 | A | | 3/1991 | Geringer et al. | |
| 5,184,854 | A | * | 2/1993 | Chen | E05C 19/166 292/251.5 |
| 5,376,910 | A | | 12/1994 | Geringer et al. | |
| 5,685,077 | A | | 11/1997 | Mukai et al. | |
| 5,746,458 | A | | 5/1998 | Fisher | |
| 6,279,218 | B1 | | 8/2001 | Lezuch et al. | |
| 6,317,996 | B1 | | 11/2001 | Myers et al. | |
| 6,430,834 | B2 | | 8/2002 | Myers et al. | |
| 6,694,568 | B2 | | 2/2004 | Baer | |
| 6,959,498 | B1 | | 11/2005 | Klonowski, III | |
| 6,994,395 | B2 | | 2/2006 | Cathala | |
| 7,021,597 | B2 | | 4/2006 | Vogt | |
| 7,021,684 | B2 | | 4/2006 | Orbeta et al. | |
| 7,246,449 | B2 | | 7/2007 | Pierson et al. | |
| 7,570,501 | B2 | | 8/2009 | Kawasaki et al. | |
| 8,094,017 | B2 | | 1/2012 | Hunt et al. | |
| 9,208,674 | B2 | * | 12/2015 | Liao | G08B 23/00 |
| 9,957,733 | B2 | | 5/2018 | Webb et al. | |
| 2007/0069523 | A1 | | 3/2007 | Nye-hingston et al. | |
| 2007/0262592 | A1 | | 11/2007 | Hwang et al. | |
| 2008/0016923 | A1 | | 1/2008 | Zheng | |
| 2008/0023970 | A1 | | 1/2008 | Chang | |
| 2009/0016523 | A1 | | 1/2009 | Dupaquis et al. | |
| 2010/0171322 | A1 | | 7/2010 | Chang | |
| 2011/0018680 | A1 | * | 1/2011 | Lai | E05C 19/166 340/3.1 |
| 2012/0118116 | A1 | | 5/2012 | Mulrine | |

* cited by examiner

ACCESS CONTROL DEVICES OF THE ELECTROMAGNETIC LOCK MODULE TYPE

This Application is a divisional of U.S. patent application Ser. No. 15/472,406, now U.S. Pat. No. 10,077,577, filed on Mar. 29, 2017, which is a divisional of U.S. patent application Ser. No. 13/618,806, now U.S. Pat. No. 9,957,733, filed on Sep. 14, 2012, which claims the benefit of U.S. Provisional Application No. 61/536,012, filed Sep. 18, 2011, which are incorporated herein by reference in their entirety.

TECHNICAL FIELD

The present invention relates to a family of electromagnetic lock modules used in an Access Control System, hereinafter referred to as an Access Control Device (ACD), having low profiles, a built-in camera, a proximity detector, support for digital notification display, and status updates. The present invention further provides components and circuitry to enable connection of the electromagnetic control module to 12 or 24 volts DC from a DC power supply or an unfiltered, rectified AC power supply.

BACKGROUND OF THE INVENTION

ACDs utilizing an electromagnetic lock for securing doors, gates, or other types of closures are well known. In a typical installation of an electromagnetic lock, a magnetically-susceptible keeper plate is mounted on a door, and an electromagnet is mounted on a door frame. When the electromagnet is energized and is in contact with the keeper plate with the door in a closed position, the keeper plate becomes an armature for the electromagnet, thus providing a mechanism for locking the door to the frame.

Currently available electromagnetic locks have some undesirable physical attributes. For example, these systems physically protrude into the door opening, thereby creating undesirable safety, convenience and aesthetic issues. Furthermore, the configuration and structure of existing electromagnetic locks do not stand-up well to door slams, which create an impact between the electromagnet that is attached to the frame and the keeper plate that is attached to the door.

Installers of electromagnetic locks or other types of access control components are frequently confronted with the lack of standardization in the industry relative to supply voltages. Some ACDs anticipate and provide for operation at 12 or 24 volts DC and others anticipate and provide for AC voltage operation. As such, supply voltages ranging from 12 to 40 volts DC or 12 to 28 volts AC may be encountered at a particular location. An installer would therefore need to match the device to the available voltage. This has traditionally meant that the installer needed to stock a supply of different locking devices that can accommodate various voltages or in some cases make complicated on-site adjustments. Adjustments create the opportunity for errors in installation or configuration, and introduce delays in the installation process. Some attempts have been made in the industry to address some of these issues or drawbacks. For example in an environment that presents 12 or 24 volts DC, one approach to overcome the previously described issue has been to utilize or provide a system having two identical coils which can be run in series or parallel, to thereby handle one supply voltage or the other for powering the magnetic coil lock. Heretofore, such systems have utilized a double pole double throw (DPDT) switch, which the installer must then set appropriately at the time of installation. Nevertheless, prior attempts to accomplish voltage selection in the field necessitated allowance for a voltage drop across the input diode. This drop resulted in a reduced holding force for the electromagnet.

Another issue that is faced with traditional installation of an electromagnetic lock is in the area of passive motion detection for the passive release of an egress door. Passive motion detectors are commonly installed as a separate unit relative to the electromagnetic lock. A common problem that exists in the field with these systems is where the separate passive motion detector such as a Passive Infrared Reader (PIR) is not properly installed and/or adjusted properly to the door with respect to the location of the electromagnetic lock. Normally, the electromechanical lock is located with respect to the door hardware. If the PIR is physically apart from the electromagnetic lock, it may not be in the proper position to detect motion near the door hardware. However, when it is located within the electromagnetic lock, it can be accurately adjusted to detect motion in a location relevant to the door hardware. If the PIR is adjusted to sense motion too far out from the door, it may not detect a person close to the door that is attempting to exit the door, thereby causing the electromagnetic lock not to unlock thus creating a safety hazard for the person. Another problem exists if the egress door is located along a hallway and the PIR's field of view is too large. This overly large view allows the PIR to not only detect those persons wishing to exit the door, but also to detect people walking down the hallway, thereby resulting in the electromagnetic lock inadvertently unlocking and leaving the door unlocked and unsecured for short periods of time. This situation also creates an unsafe condition by potentially allowing an intruder the ability to enter the building.

Another problem concerning the use of PIR motion detectors in association with doors is the sensitivity of the unit with respect to background conditions. Different surfaces reflect IR differently and impact the ambient lighting environment, i.e. an individual's IR signature may be different if the floor is a polished concrete versus a colored Berber carpet. The same can be said with regard to fluorescent lighting vs. incandescent lighting. Also, building automation systems may reduce ambient lighting in off hours which would have an impact where the IR sensitivity would need to be adjusted to remain consistent.

What is needed is a robust and efficient electromagnetic lock for access control systems that can be universally implemented without the drawbacks and deficiencies described above. What is further needed is an ACD that includes a low profile electromagnetic lock that supports modern accessories such as, for example, a Closed Circuit Television (CCTV) camera, Charge-Coupled Device Television (CCD-TV) camera, passive motion detection, digital notification display, automatic source voltage selection, door or lock status indicators. What is still further needed is a device that is easy to install accurately, while avoiding the short comings of current systems is desired. The present invention fills these needs as well as other needs.

SUMMARY OF THE INVENTION

In order to overcome the above stated problems, one aspect of the present invention provides an electromagnetic lock module for use as an ACD, wherein the electromagnetic lock module includes features and advantages in its physical components, dimensions, mounting positions, mounting ease, and configuration.

With respect to the overall dimensions of the electromagnetic lock, a low profile device is highly desirable. In the present invention this feature is achieved by sizing the length of the magnetic structure as required to provide a particular holding force value. If a lower holding force is sufficient for a given application (i.e. release of interior doors,) then the length of the device can be shortened. The result is a family of magnetic locks with varying holding forces and lengths optimally sized and configured for its purpose. A longer device that is needed to provide a higher holding force requires mounting of the PIR and camera near the center of the unit pointing down and away from the door face A shorter unit sufficient to provide a lower holding force can have the camera and PIR located at the ends.

According to another aspect of the present invention, features and advantages in a control circuit for the ACD are provided, wherein a microcontroller is utilized to provide voltage control wherein automated switching of two identical coils between a parallel and series configuration is performed on the basis of the voltage level that is available from the site/location power supply. The microcontroller also provides door and lock status indication, notification and automated relock of the electromagnetic lock.

In a further aspect of the present invention, a peak detection and hold feature is implemented when an unfiltered rectified AC power supply is connected to the electromagnetic lock module to permit correct measurement of the input voltage.

In a further aspect of the invention, circuitry is provided to minimize a voltage drop across the input diode that could reduce the holding force of the electromagnet.

In yet another aspect of the present invention, a passive motion detection device such as a PIR is positioned within the electromagnetic lock module to thereby detect the proximity of a person to a secured door and initiate unlock procedures and sequences. This passive motion detector could employ background elimination techniques to automatically correct for background variations in the environment wherein human motion would need to be detected.

In an even further aspect of the present invention, a camera having an adjustable field is mounted in the electromagnetic lock module and is directed out of the back of the electromagnetic lock module away from the door at an angle that allows for visual facial identification of persons approaching and/or exiting through the door.

Additional benefits of the above described system and method of providing power and data communication respecting a door and lock are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

DETAILED DESCRIPTION OF THE PREFERRED EMBODIMENT

Generally, the systems, components and methods described herein for providing and implementing an ACD for a door or closure consisting of an electromagnetic lock module and associated features according to the present invention, may be implemented in a variety of hardware and component configurations, software or combinations thereof.

This document is organized as follows. First, an overview of the electromagnetic lock in accordance with certain aspects of the present invention is described. Next, components of an exemplary device that achieves some of the aspects of the invention are identified and described. Following this, the logic and operation flow of the exemplary electromagnetic lock for enabling certain aspects of the present invention is presented. Next, the details of the electronic circuitry of the electromagnetic lock in accordance with the present invention are discussed, along with the circuitry for enabling the automatic voltage selection and the voltage drop minimization features of the invention. Thereafter, there is a discussion of the physical aspects of the electromagnetic lock module, the physical installation of the device, and the features that are uniquely characteristic of the ACD of the present invention.

Figure 1:
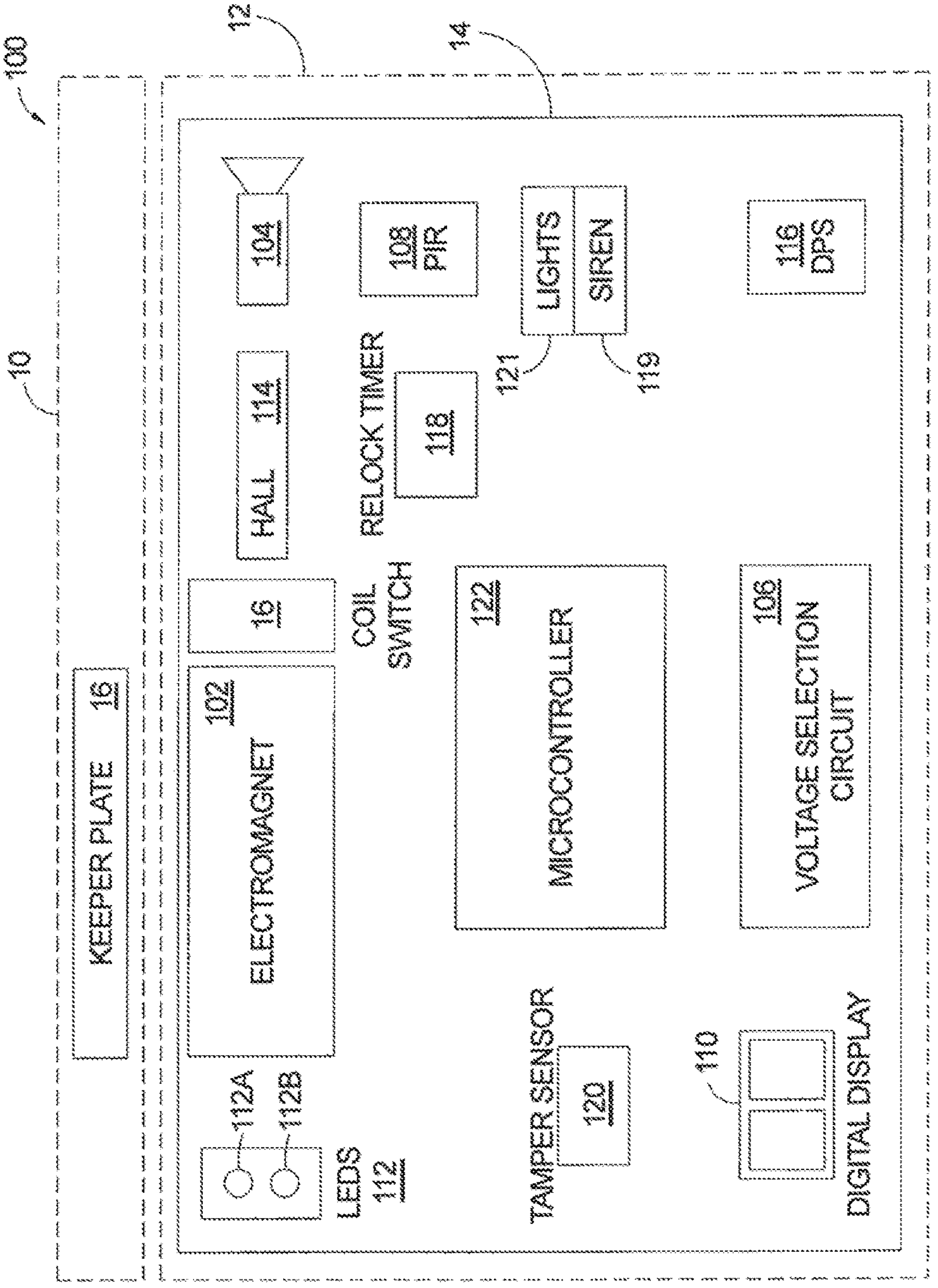
FIG. 1 is a component block diagram of an electromagnetic lock as an ACD in accordance with one aspect of the present invention

Referring to the drawings, and initially to FIG. 1, an ACD is provided and is identified as reference numeral 100. In general, ACD 100 is configured for selectively locking and unlocking a door 10 that is pivotally coupled with a door frame 12 by a hinge. ACD 100 may include an electromagnetic lock module 14 that is configured to be affixed to door frame 12, and a keeper plate 16 that is configured to be affixed to door 10. When the electromagnet 102 is energized, keeper plate 16 is attracted to electromagnet 102, and door 10 is placed in a locked condition when door 10 is closed. While the aspects of the present invention are described with reference to a door, it should be understood that the present invention is also applicable to gates, entryways or other similar access mediums, closures or objects that may be locked/unlocked remotely or locally by the use of a power source.

Electromagnetic lock module 14 may integrate a number of components, such as electromagnet 102, an access monitoring device 104, a voltage selection circuit 106, a passive motion detector such as PIR 108, a digital notification display 110, visual lock status indicators (LEDs) 112A, 1126, a bond status monitor 114, a door position status sensor (DPS) 116, an adjustable relock timer 118, an optional audible sounder 119, an anti-tampering monitor/sensor 120, an emergency strobe or constant light 121, a microcontroller 122. ACD 100, in accordance with the invention supports ease of installation by enabling automated source voltage detection and comprising an adaptable circuit for handling varying voltage sources, or any combinations thereof.

In one aspect of the present invention, access monitor device 104 may be a Closed Circuit Television (CCTV) camera, a Charge-Coupled Device Television Camera (CCD-TV), or other type of still image or video camera. Camera 104 may be integrated into electromagnetic lock module 14 and directed out of the back of electromagnet lock module 14 away from the door 10, so as to capture persons and/or objects within the adjustable field. A graphical representation of the available viewing regions of camera 104 is shown in FIG. 2.

Figure 2:
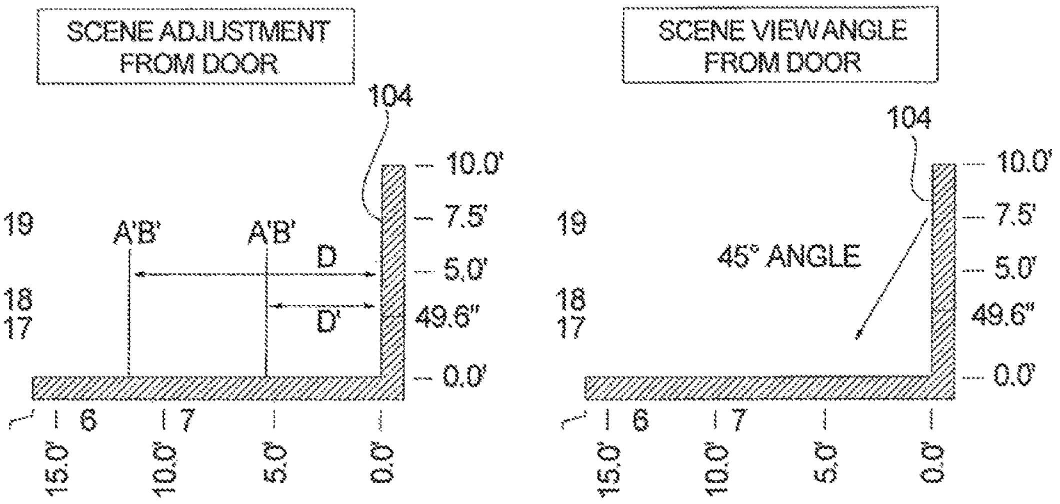
FIG. 2 is a graphical representation of the available view regions of a camera that may be used with the electromagnetic lock in FIG. 1.

As best seen in FIG. 2, the position and orientation of camera 104 within electromagnetic lock module 14 dictates the viewing region and the view angle of camera 104. The present invention provides an adjustable viewing field/region that extends from approximately 2 feet to 8 feet from the intersection of the door face and floor, as measured along the floor. Camera 104 may be positioned within the electromagnetic module 102 to provide the proper viewing angle for visual facial identification of persons approaching and/or exiting through the door, even persons wearing a brimmed hat. This is unlike traditional CCTV security cameras mounted on the ceiling or above the door frame, which are unable to capture the facial identification of a person wearing a brimmed hat due to the higher angle of view.

Passive motion detector 108 is used to passively detect the proximity of a person desiring egress and to unlock the door using ACD 100, thereby allowing the person to open and walk through the door. In one aspect of the present invention, passive motion detector 108 may be a PIR device. PIR 108 may be mounted or otherwise integrated and located within electromagnetic lock module 14 facing outwardly from the door to cover a predetermined range of detection, which may be referred to herein as a PIR detection zone. Integrally mounting PIR 108 within electromagnetic lock module 14 enables a desired field of view of the monitored entry way, which in turn provides the correct and safe detection of a person desiring egress through the locked door. PIR 108 may be designed to point down at an angle from the back of electromagnetic lock module 14, with an adjustable view to enable coverage of a wide field range. In one embodiment, the PIR detection zone may lie in the range from approximately 0 to 10 inches to approximately 0 to 3 feet out from the door, and approximately 4 to 8 feet wide, centered on the door.

Figure 3:
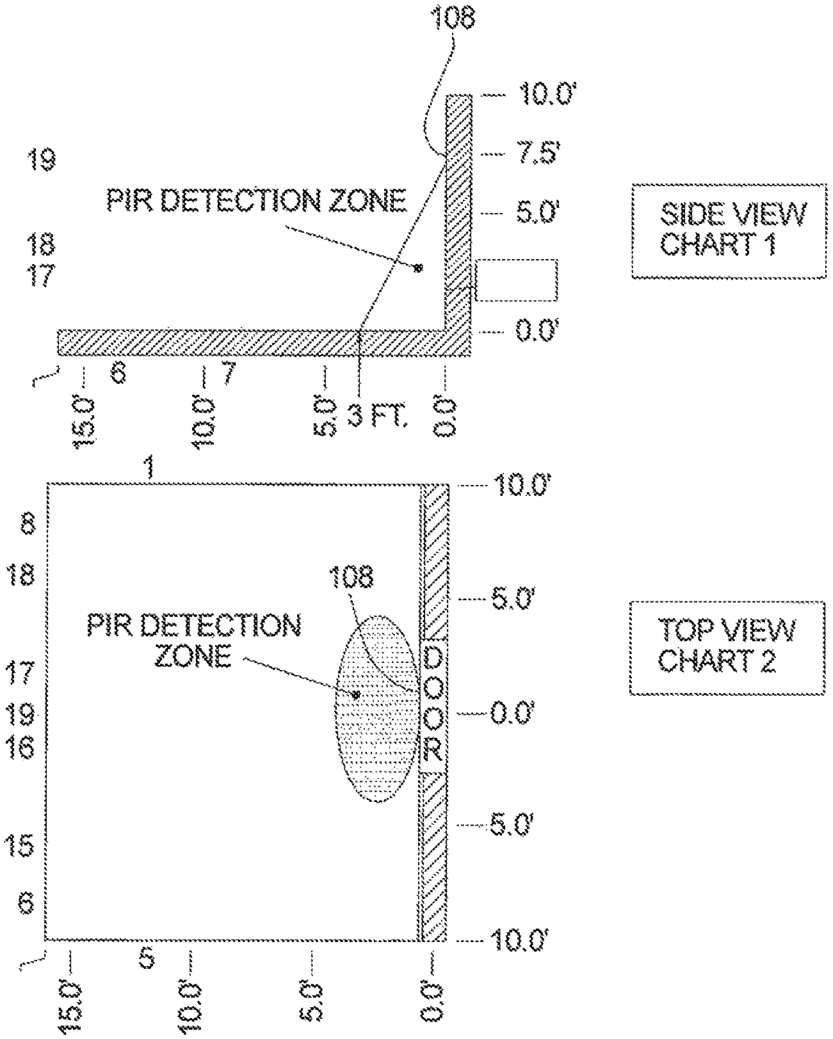
FIG. 3 includes a side view chart and a top view chart showing one alternative detection zone range for a passive motion detector included in the ACD in FIG. 1.
Figure 4:
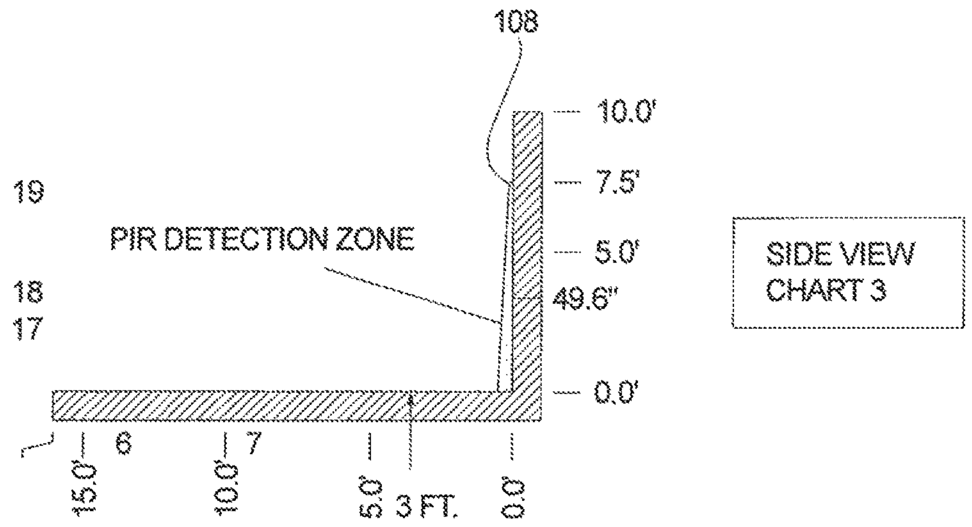
FIG. 4 includes a side view chart and a top view chart showing another alternative detection zone range for a passive motion detector included in the ACD in FIG. 1.
Figure 4:
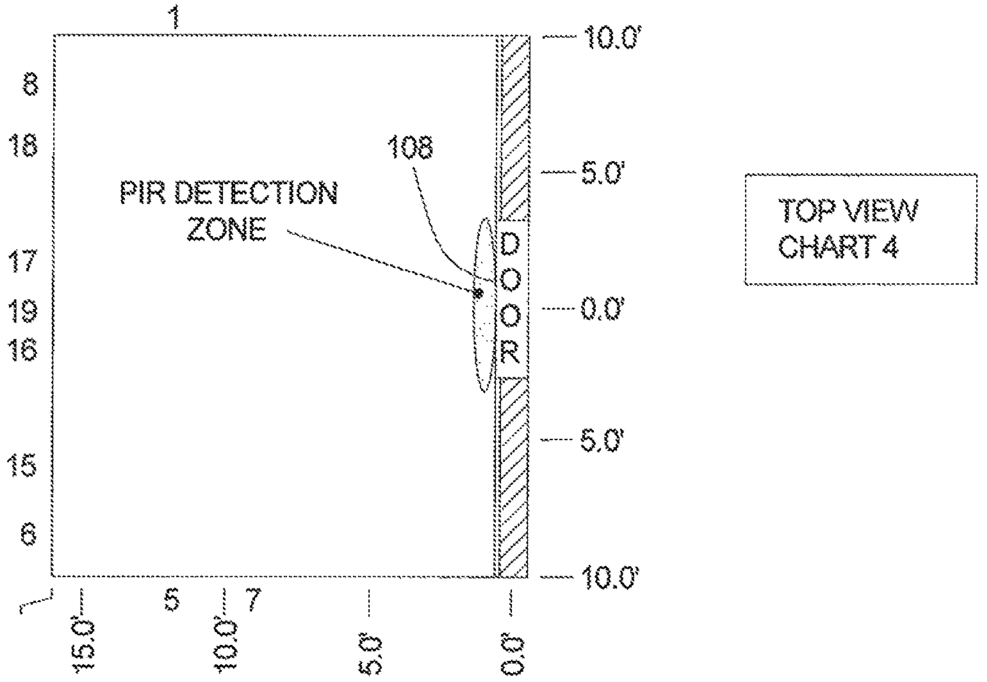

As best seen in FIG. 3, Chart 1 illustrates the side view of the PIR detection zone on the larger range of the scale (i.e., view of approximately 0 to 3 feet), and Chart 2 set forth below illustrates the top view of the 0 to 3 feet PIR detection zone range. As best seen in FIG. 4, Chart 3 set forth below illustrates a side view of a PIR detection zone on the smaller range of the scale (i.e., view range of approximately 0 to 10 inches), and Chart 4 set forth below illustrates the top view of 0 to 10 inches PIR detection zone range.

With reference to FIG. 3, as seen in Chart 1, given that PIR 108 is mounted above the door frame at approximately 7.5 feet, coverage may be provided for a detection zone reaching out to approximately 3 feet from the base of the door. As seen from this view, the detection zone defines a triangular region. Turning to Chart 2, and viewing the detection zone from a different perspective (top view), the detection zone defines an elliptical region on the floor proximate the door. In other words, considered together, Charts 1 and 2 present a PIR detection zone is essentially defined by an elliptic cone that radiates outwardly from the PIR position towards the floor. Other positions of the PIR and shapes of the detection zone are contemplated and within the scope of the present invention. The function and use of the detection zone will be further described with reference to the operational flow of the ACD.

Figure 6:
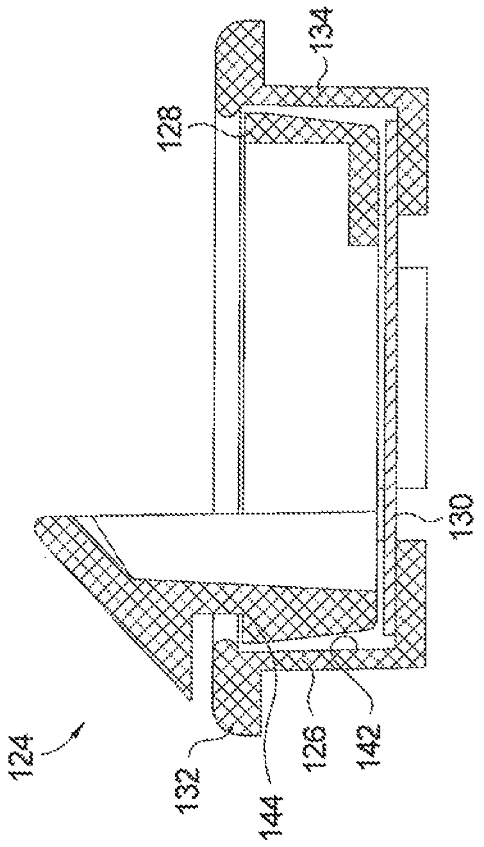
FIG. 6 is a cross-sectional view of the viewing adjustment assembly set forth in FIG. 5.
Figure 5:
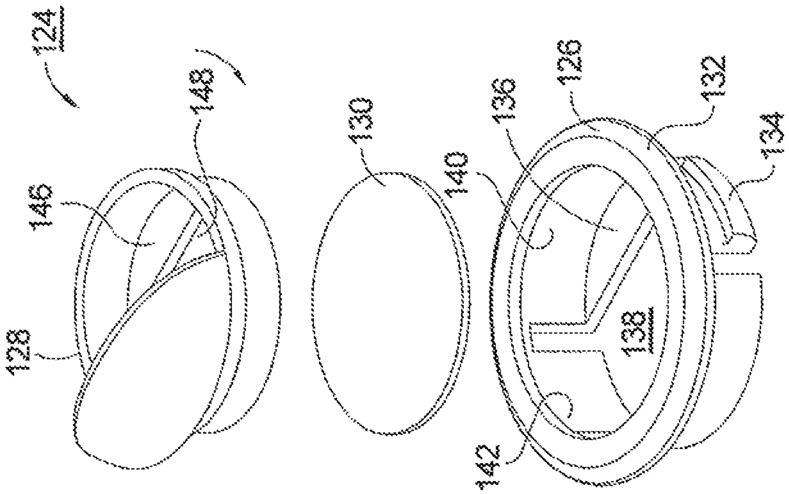
FIG. 5 is an exploded view of a viewing adjustment assembly that may be used in conjunction with the passive motion detector.
Figure 7:
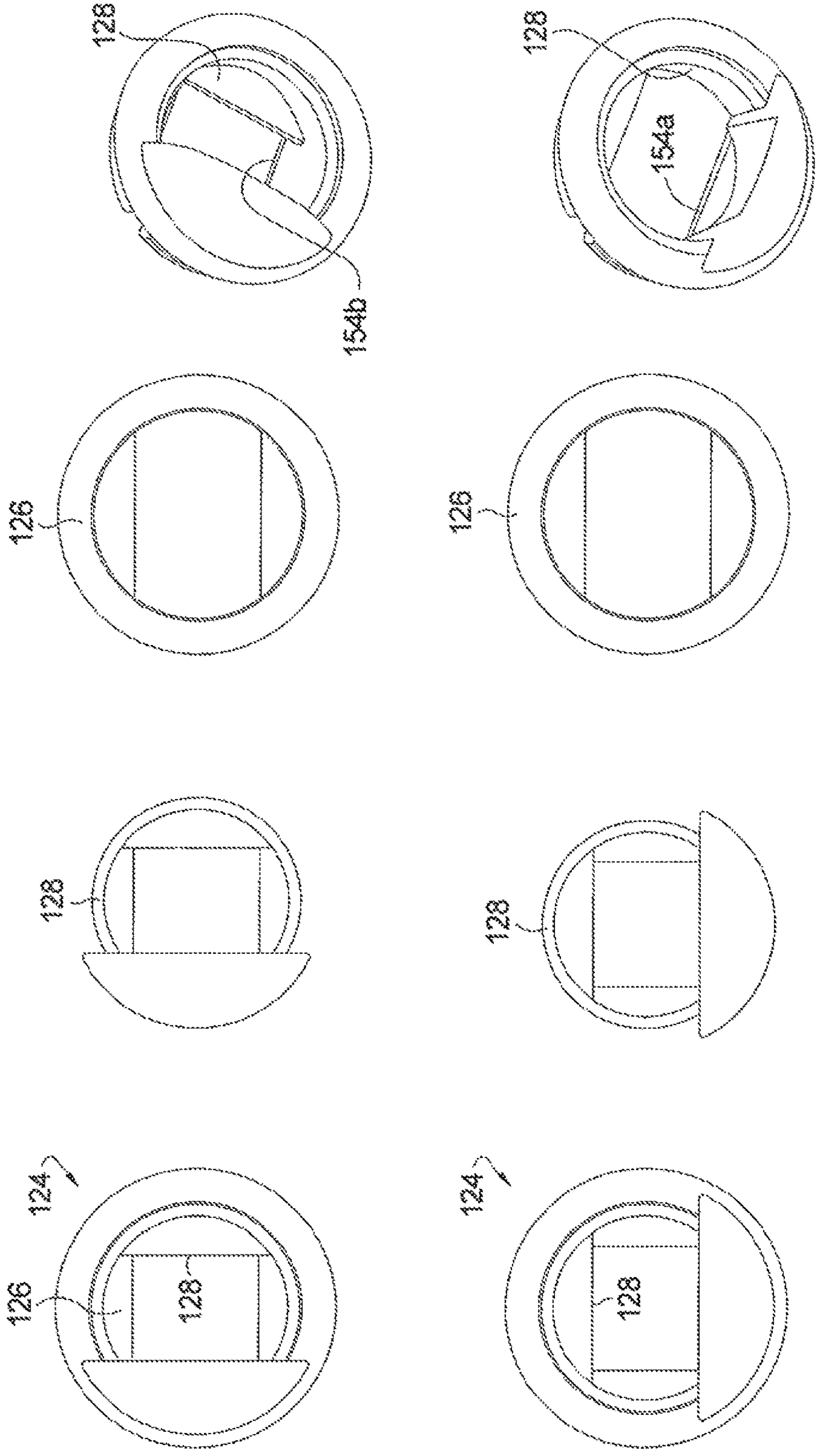
FIG. 7 is a view showing two positions of the viewing adjustment assembly that provide for a long view and a short view

In accordance with one aspect of the present invention, as best seen in FIGS. 5-7, the field of view of PIR 108 may be adjusted using a viewing adjustment assembly 124. Viewing adjustment assembly 124 is configured to be mounted to electromagnetic lock module 14 and may include an outer ring 126, an inner ring 128, and optionally a lens 130 that provides PIR 108 a field of view that is external to electromagnetic lock module 14. As best seen in FIGS. 5 and 6, outer ring 126 may be cylindrical and include an outwardly extending rim 132, at least one resilient retaining arm 134, and a back wall 136 extending into the opening formed by outer ring 126. Back wall 136 has an aperture 138 defined therein. Both an inner surface 140 of outer ring 126 and retaining arms 134 may include an annular groove 142 defined therein.

Inner ring 128 of viewing adjustment assembly 124 is configured for being positioned within outer ring 126 and may include an annular edge 144 extending outwardly from an outer surface of inner ring 128. Edge 144 is configured for being received in groove 142 of outer ring 126 so that inner ring 128 is rotatably secured to outer ring 126. Inner ring 128 may further include a front wall 146 extending into the opening formed by inner ring 128 and having an aperture 148 defined therein that is substantially the same shape as aperture 138 defined in outer ring 126. For example, apertures 138, 148 may both be rectangular shaped, but other shapes are also contemplated herein. Inner ring 128 may further include a feature formed in a size and location that will engage the outer periphery of lens 130, as well as position lens 130 between front wall 146 and back wall 136. As best seen in FIG. 7, inner ring 128 may be rotated relative to outer ring 126 to easily adjust the field of view of PIR 108 without the use of tools. When apertures 138, 148 are aligned with one another so that they are parallel with one another, as seen in the lower row of figures in FIG. 7, the field of view 154*a* of PIR 108 will be lengthened (i.e., long view). When apertures 138, 148 are oriented with one another so that they are perpendicular or otherwise misaligned with one another, as seen in the upper row of figures in FIG. 7, the field of view 154*b* of PIR 108 will be shortened (i.e., short view).

With reference to FIG. 1, digital display 110 may be optionally integrated into the electromagnetic lock module 14 and located such as to provide information or notification to persons seeking egress and/or ingress through door 10 depending on the particular application environment. Digital display 110 may be a multi-character digital display for providing notification messages. The messages displayed on the digital display 110 may be generated by the circuitry of the ACD 100 or originate as messages from other sources. Such messages may include building status information, such as, but not limited to, "Lock Down", "Proceed to another Exit", etc.

In addition to or as an alternative, the visual lock status indicator LEDs 112A, 112B may be provided to convey other visual indications of door position, lock status, etc. For example, a red/green LED may be provided to indicate when the unit is powered, or to indicate lock status, respectively. In the case of the dual red/green LED, green LED 112A may indicate that the lock is secure and red LED 112B may indicate that the lock is unsecure. The subsequent discussions of the operational flow of the present invention will further explain and illuminate this feature.

In general, with reference to FIG. 1, when ACD 100 is in a locked state, the proper alignment of electromagnet 102 and keeper plate 16 is integral to the operation of the lock. In the present invention, this aspect is monitored and controlled via the bond status monitor 114 and microcontroller 122. Bond status monitor 114 provides a signal that is utilized in the operational flow of the present invention to determine the sequence of operation. Specific details of the bond status monitor and the implementation of same is the subject of U.S. patent application Ser. No. 12/345,727 filed on Dec. 30, 2008, which has a common assignee with the present invention.

Door position information is provided by DPS 116. In one embodiment, DPS 116 is an electrically isolated dry contact magnetic reed switch that is utilized to monitor the door's closed status. The switch is activated by a permanent magnet located within the strike plate assembly.

The relock timer 118 is utilized to provide a time delay between the opening of the lock and when the door should be relocked. Relock timer 118 may be triggered by the rising edge of a power signal to electromagnet lock module 14, the field of view signal of PIR 108 being cleared, or a Request to Exit (REX) signal. The relock timer 118 is configurable for selectable delays such as none, 5, 15 or 30 seconds and is implemented by microcontroller 122.

The audible sounder 119 may be housed in electromagnetic lock module 14 to provide audible notification of the status of door 10. The audible notification may include audible beeping and/or audible digital voice to assist a blind person to egress through a locked door for Americans with Disabilities Act (ADA) compliant conditions.

Figure 11A:
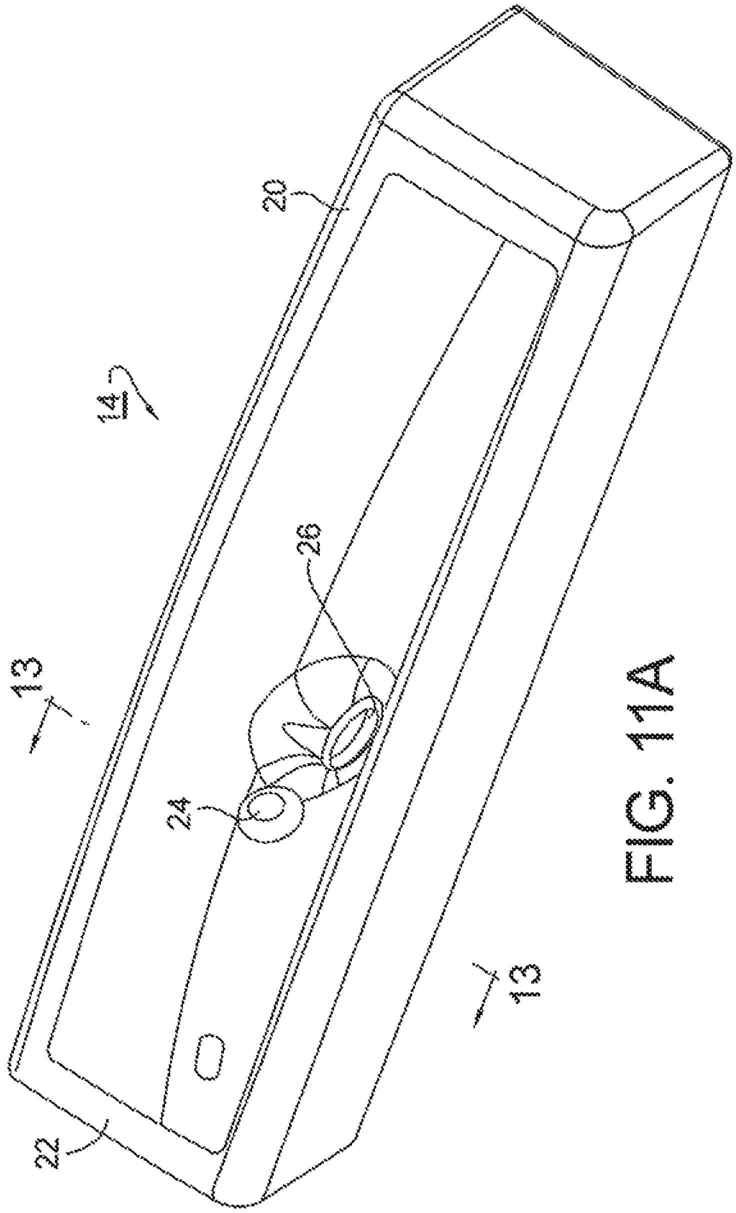
FIG. 11A is a perspective view of an electromagnetic lock module with accessories according to one aspect of the present invention which when coupled with a door mounted strike plate becomes the ACD set forth in FIG. 1.

The anti-tampering sensor 120 is provided to monitor access to panel 22 (FIG. 11A) located on the unsecure side of electromagnetic lock module 14. This feature provides a further security feature and may be utilized to maintain an audit trail.

The emergency light 121 may be housed in electromagnetic lock module 14 to provide notification of the exit door location in an emergency situation, for example, during a fire or a building lock down.

In a further aspect, the present invention may provide a unique solution for providing power, which separates the Printed Circuit Board (PCB) and Magnet driver supply voltages. This separation enables the continuous operation of the electronic circuitry of the PCB including all the features of ACD 100, while still permitting the operation of electromagnet 102 to be controlled by the ACD 100. The PCB is run off 5 volts DC, while electromagnet 102 requires approximately 12 or 24 volts DC for operation. The camera 104 and PIR 108 are powered off a separate 9 volt DC supply, and therefore failure of the main 12/24 volt supply will not affect the operation of these features.

The microcontroller 122 provides the logic and operational flow of the ACD 100 and is adapted to provide the various features and functions of the improved system of the present invention as described herein.

Figure 8A:
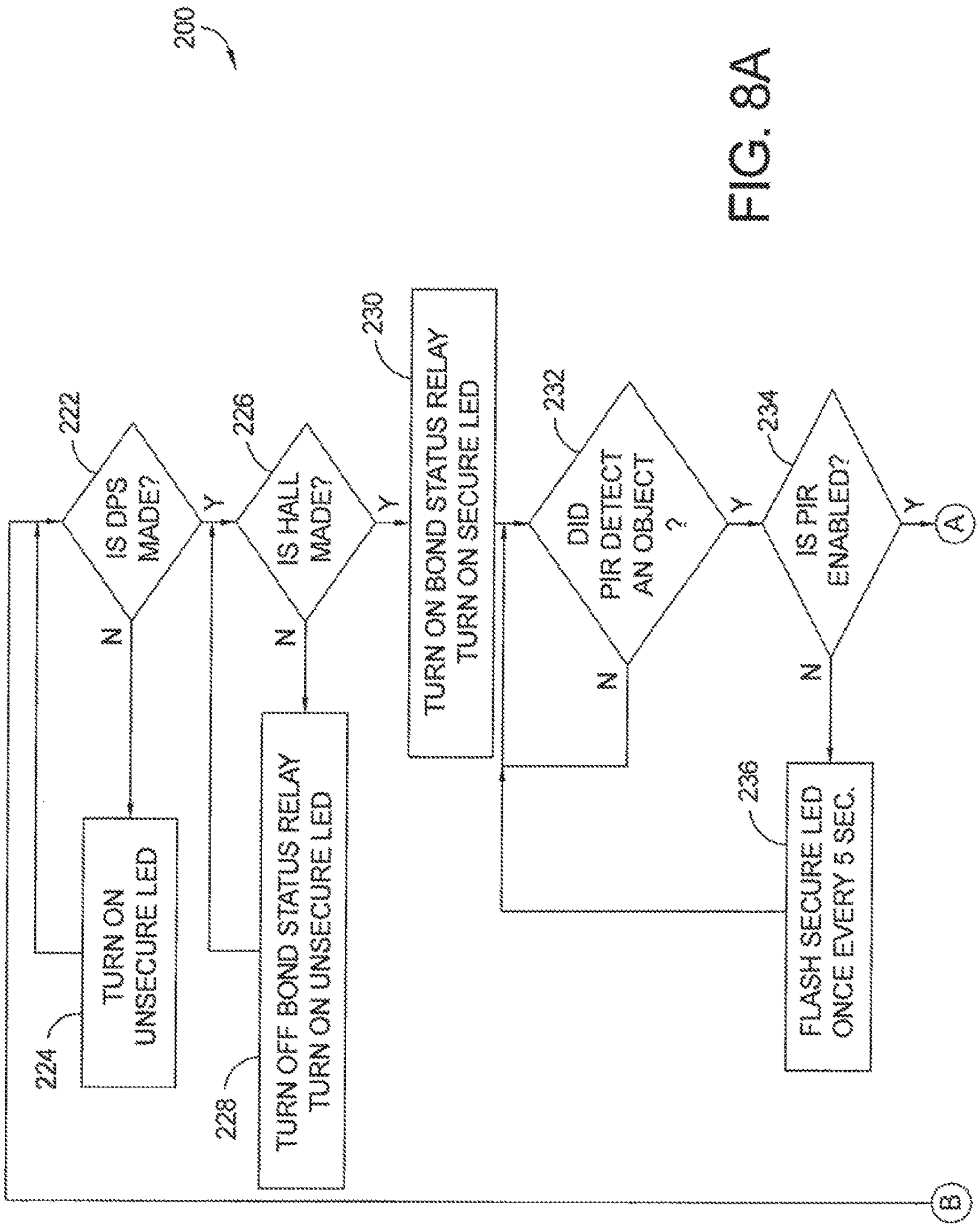
FIGS. 8A-8C represent an exemplary operational flow chart for the electromagnetic lock module according to an aspect of the present invention.
Figure 8B:
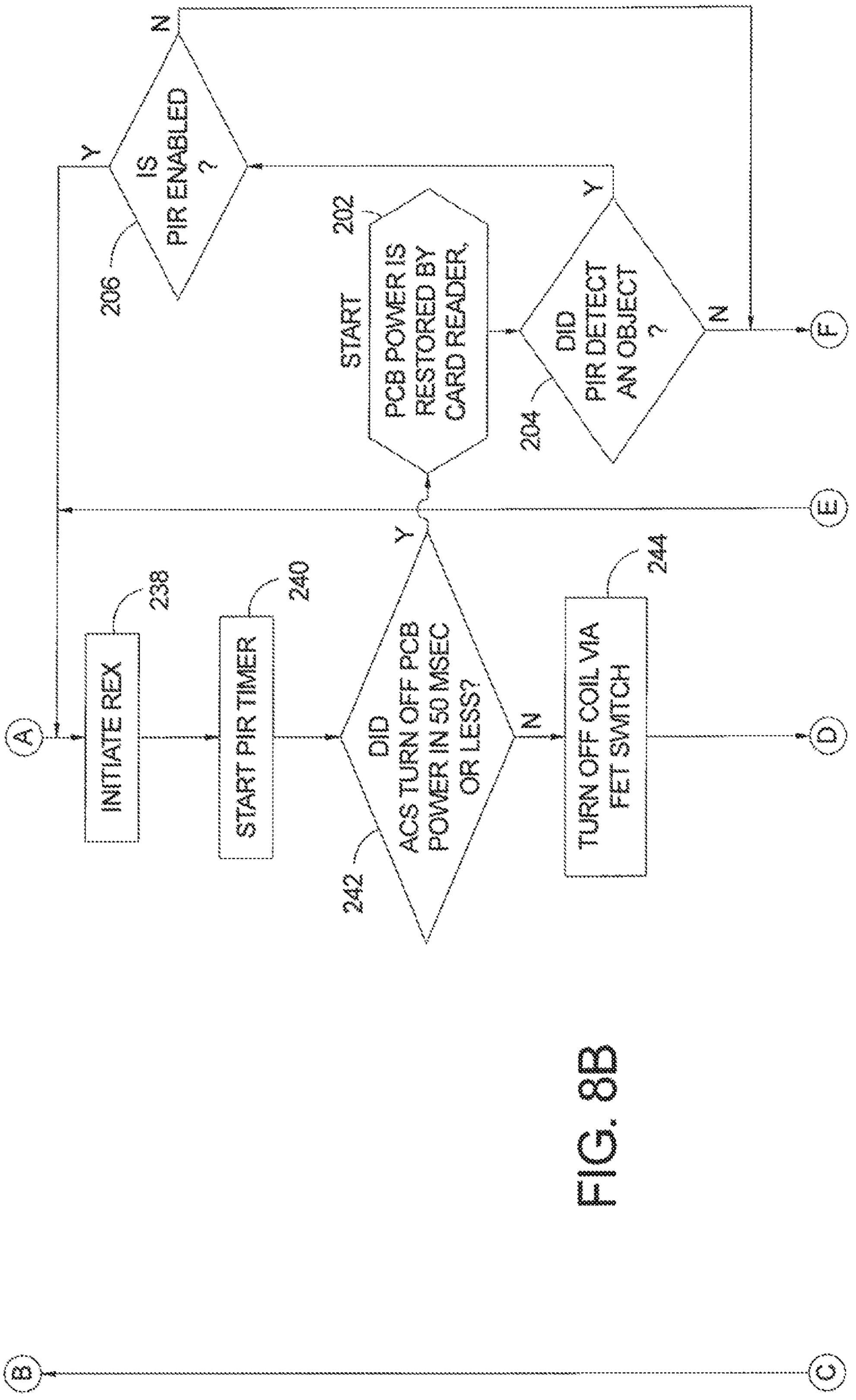
Figure 8C:
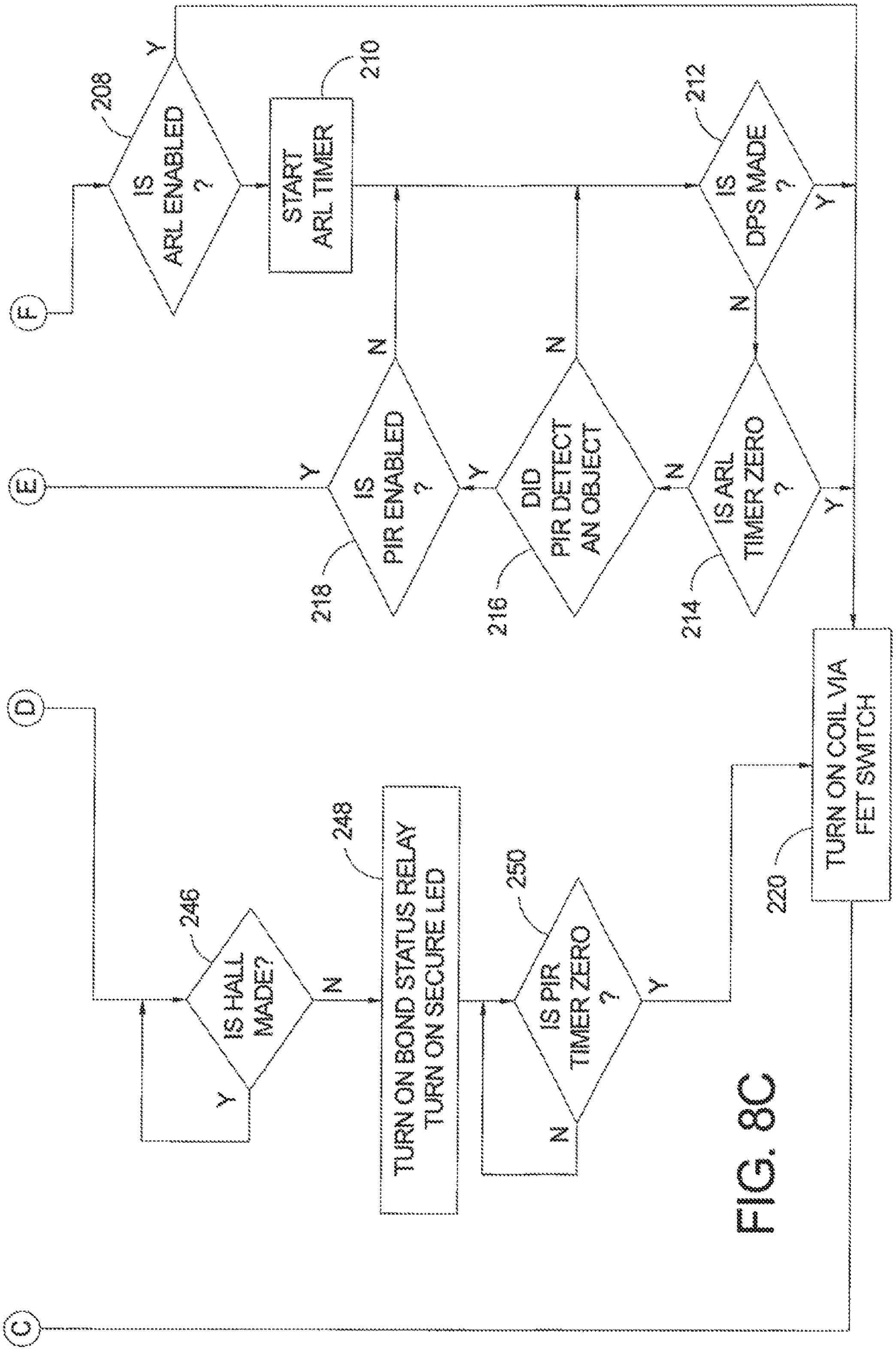

Turning to FIG. 8 and with reference thereto, the operational flow of the ACD 100 will be described. In one embodiment of the present invention, the operational flow of the system including the features that were earlier identified is provided by microcontroller 122. Microcontroller 122 is programmed and physically wired to provide aspects of the various features and functions described herein.

As shown in the flow diagram 200, there is an initial set of procedures and steps 202-218 that are performed each time that the system is powered on. Following this, operation continues in an endless loop comprising steps 220-250, of monitoring the door way, providing signals, monitoring signals and providing access as needed.

Processing begins at step 202, with the application or restoration of power to the PCB. Power may be applied from a card reader, ACD 100, or other source. A determination is made at step 204, to ascertain if PIR 108 detected an object. If PIR 108 detects an object, a further inquiry is made to determine if the feature of the program that utilizes PIR 108 is enabled, at step 206. If that feature is not enabled, processing continues in the same strand as when there is no detection by PIR 108. In other words, processing proceeds to step 208.

At step 208, the enabled/disabled status of adjustable relock timer 118 is ascertained. If adjustable relock timer 118 is not enabled, processing proceeds to step 220, where electromagnet 102 is activated and door 10 is locked. Conversely, if the timer 118 is enabled, the timer is started at step 210.

Next, an inquiry is made regarding door position status monitor (DPS) 116, at step 212. If DPS 116 is made (i.e., if door 10 is in the closed position), processing proceeds to step 220, where an electromagnetic coil switch 18 (FIG. 1) for door 10 is turned on, hence locking door 10 relative to door frame 12. On the other hand, if DPS 116 is not made (i.e., door 10 is in the open position), then the system determines at step 214 if relock timer 118 has counted down to zero. If the countdown is complete then coil switch 18 to lock door 10 is activated at step 220. If countdown is not complete as determined at step 214, the system proceeds to step 216 and tries to determine if PIR 108 detected any objects. If no objects are detected the system returns to step 212 to determine if DPS 116 contact is made. If however an object was detected by PIR 108 during step 216, the system proceeds to step 218 to check if PIR 108 is enabled. If PIR 108 is not enabled, processing returns to step 212, where the door status is checked by inquiring about whether DPS 116 is closed. Alternatively, if PIR is enabled, processing jumps to step 238 within the previously identified continuous loop—steps 220 to 250.

The continuous loop of steps 222-250 essentially determines on an ongoing basis, if door 10 is closed, it also checks for alignment of electromagnet 102 and keeper plate 16, monitors the Infrared motion detector to determine when to initiate a request for exit and start a delay timer that will signal when the detected object should have cleared door 10, then turns on electromagnet 102 to lock door 10. As part of the ongoing processing, the status of power from the ACD 100 to the Processor Control Board (PCB) is also monitored. Appropriate LEDs 112 are illuminated to indicate the various stages and status of the system.

In operation, when door 10 is locked (i.e., electromagnet 102 is turned on at step 220), processing proceeds to step 222. At step 222, a determination regarding the closed or opened status of door 10 or other monitored object is made. This determination involves evaluating information from DPS 116. If door 10 is determined to be in the open position (i.e., DPS 116 is not closed), a visual indication is provided whereby LED 112B which depicts an un-secured status is illuminated at step 224. The un-secure LED 112B remains illuminated as long at door 10 is in the open position. When DPS 116 is made (i.e., door 10 is in the closed position), a determination is made about the bond status (i.e., the alignment of electromagnet 102 and keeper plate 16, at step 226.

The bond status is determined by evaluating the state of a Hall effect—bond status monitor 114. If Hall effect monitor does not indicate proper alignment, a bond status relay RLY1 is turned off and the un-secured status LED 112B is illuminated, at step 228. The relay RLY1 remains off and the un-secure LED 112B remains on until the Hall Effect monitor indicates proper alignment. When this status is achieved, the bond status relay RLY1 is turned on, and the secure status LED 112A is illuminated at step 230.

Next PIR 108 is monitored at step 232 to determine if any objects, such as a person, are detected within the PIR detection zone. Until a person is detected, the system remains in a state where it continues to monitor the PIR detection zone. Once a person is detected, the system moves to step 234 to determine, if the PIR feature is enabled. If the PIR feature is not enabled, processing proceeds to step 236, where the secure LED 112A is flashed repeatedly on a 5 second interval. As long as the detected person remains in the detection zone and PIR 108 was not enabled the system will merely continue to flash the LED 112A and provide no further processing. Conversely, if the PIR feature is enabled, the detection of a person would cause processing to proceed to step 238.

A Request for Exit (REX) is initiated at step 238. This is followed by starting a PIR timer at step 240. While the timer is timing, the system evaluates if power to the PCB was turned off within approximately 50 milliseconds.

If the power was turned off, processing will branch to step 202. At step 202, when power is restored to the PCB, the system will proceed through all of the previously described steps again. If on the other hand, power to the PCB remained on or was not turned off within approximately 50 milliseconds, processing continues to step 244 where coil switch 18 for door 10 is turned off.

Following the shut off of coil switch 18, the Hall Effect monitor is evaluated at step 246 to determine if door 10 is still locked. If the Hall Effect monitor indicates proper alignment (i.e., door 10 is still locked), the system essentially waits until the Hall effect monitor indicates improper alignment. Once this occurs (i.e., door 10 is no longer locked), the bond status relay RLY1 is turned off and the un-secure LED 112B is illuminated, at step 248.

At this point, the previously initiated PIR timer is examined at step 250 and the system waits until it finally times-out. In other words, the system waits for the anticipated duration that it should take for a detected person to clear the entry-way. Following the time-out of the PIR timer, electromagnet 102 for door 10 is turned on at step 220, and the entire cycle starts back at step 222.

Figure 9:
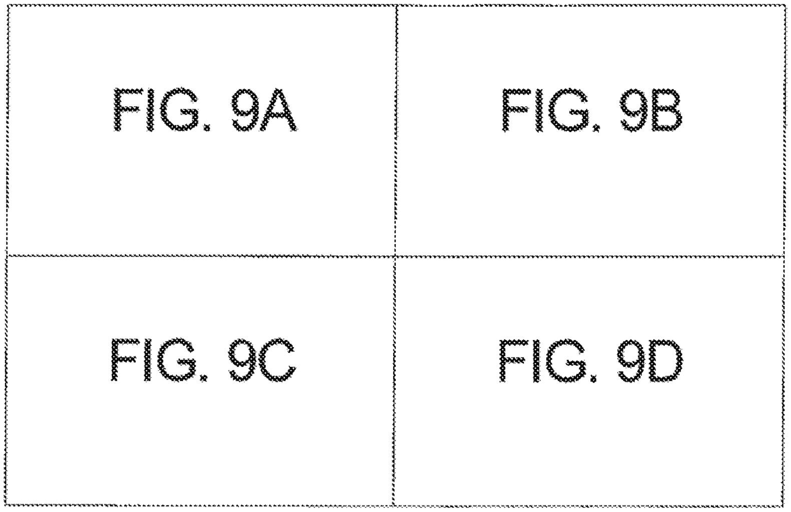
FIG. 9 and FIGS. 9A-9D are schematic diagrams of the circuitry implemented in the exemplary embodiment of the ACD of the present invention.
Figure 9A:
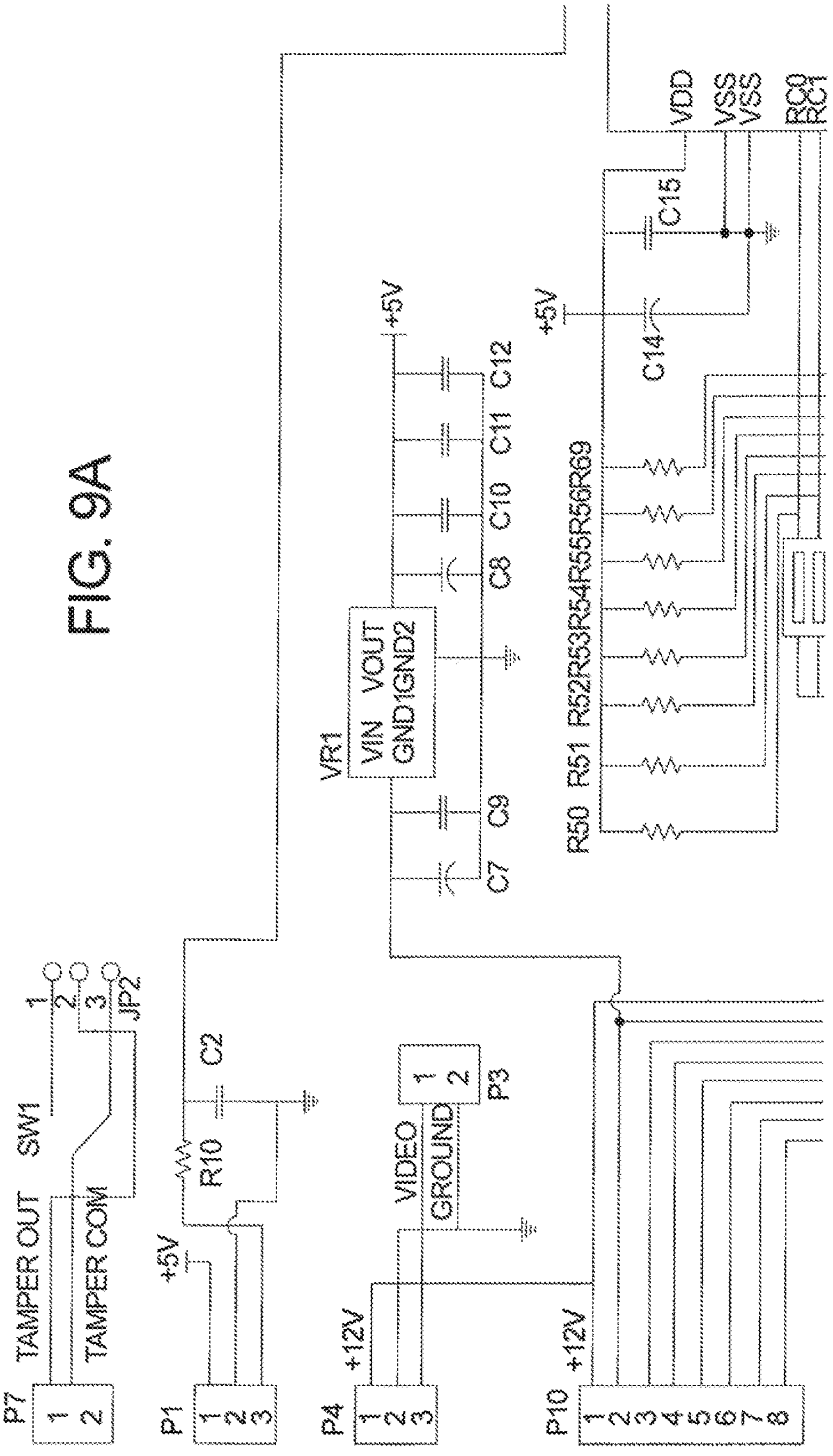
Figure 9B:
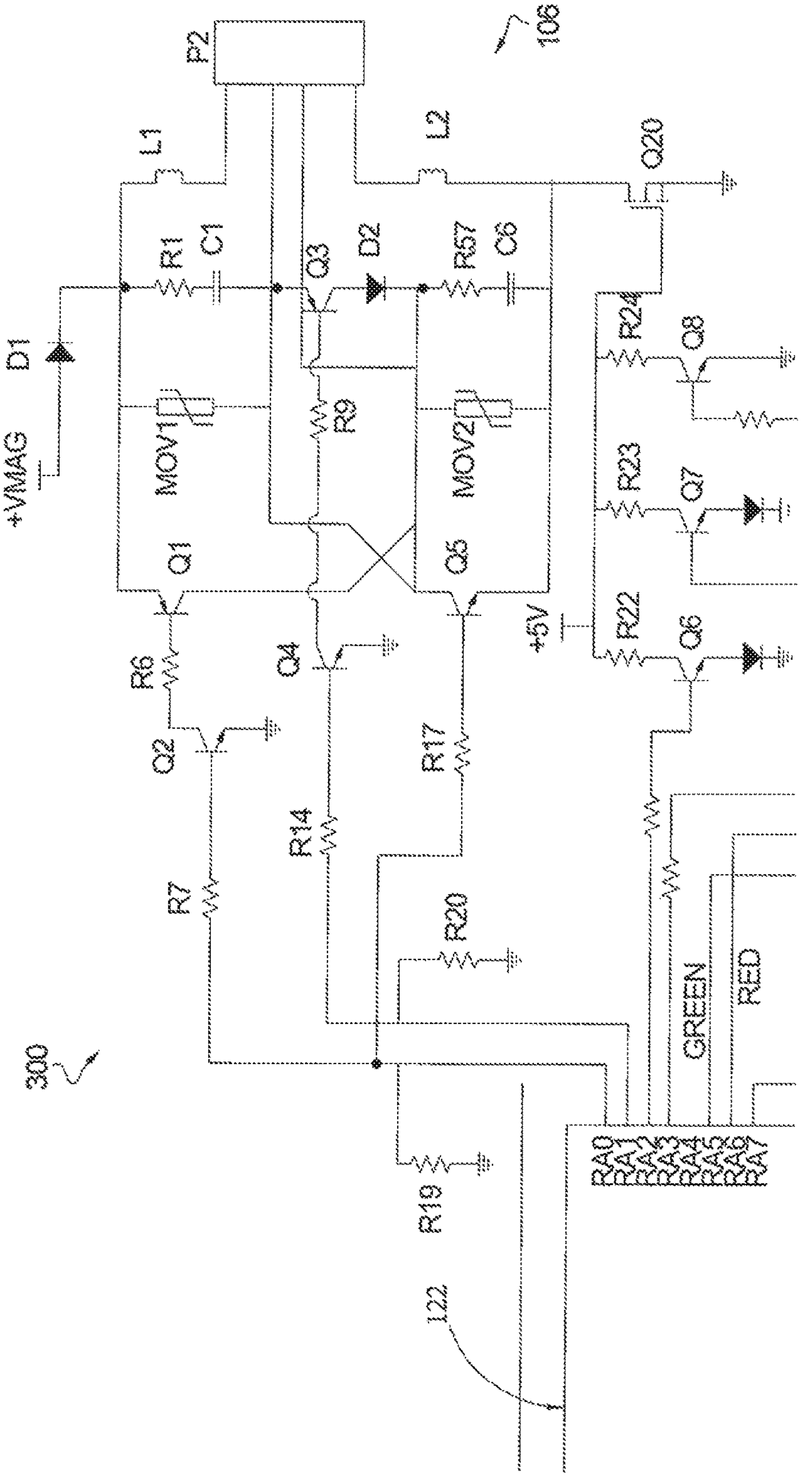
Figure 9C:
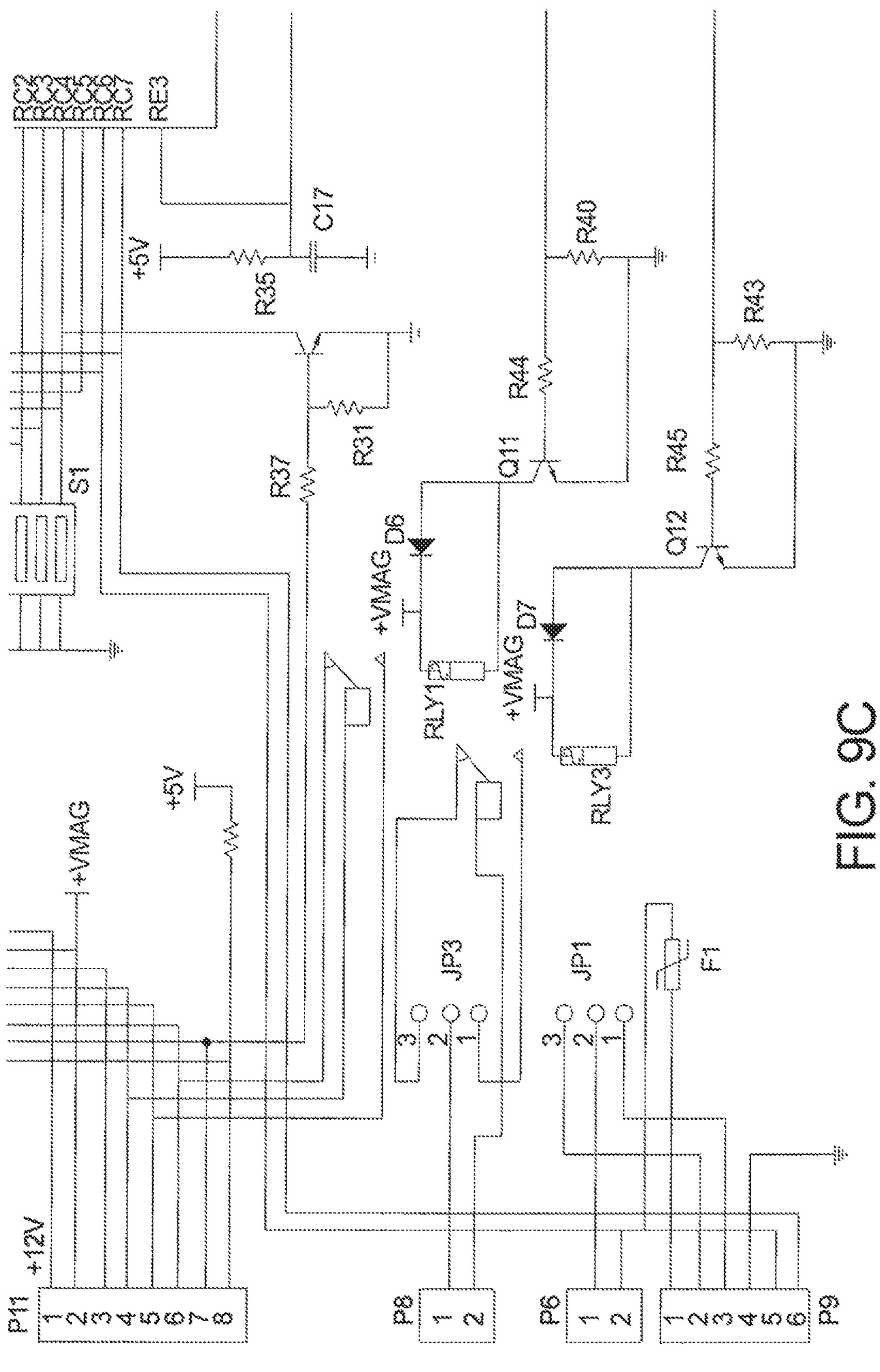
Figure 9D:
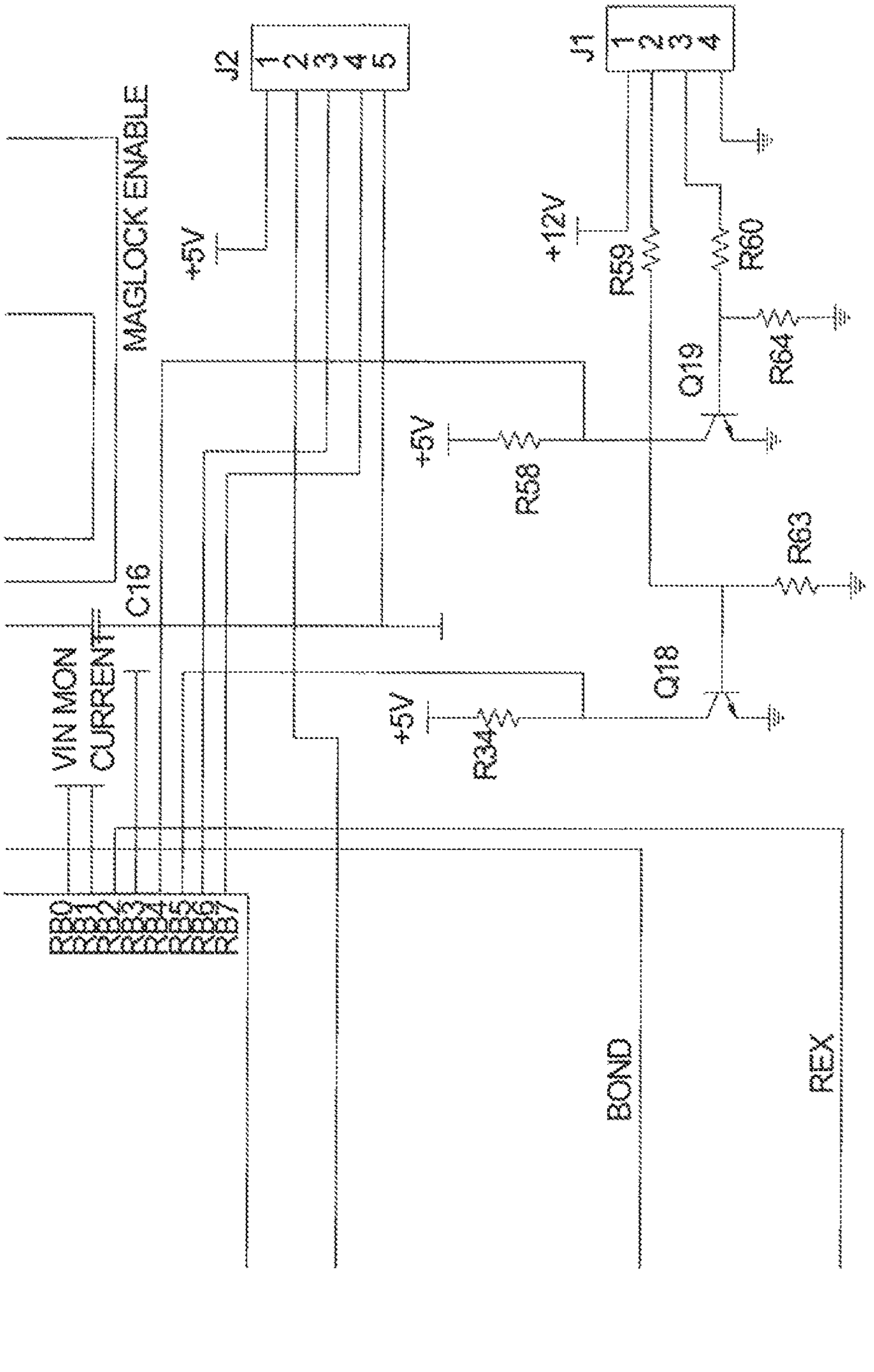
Figure 10A:
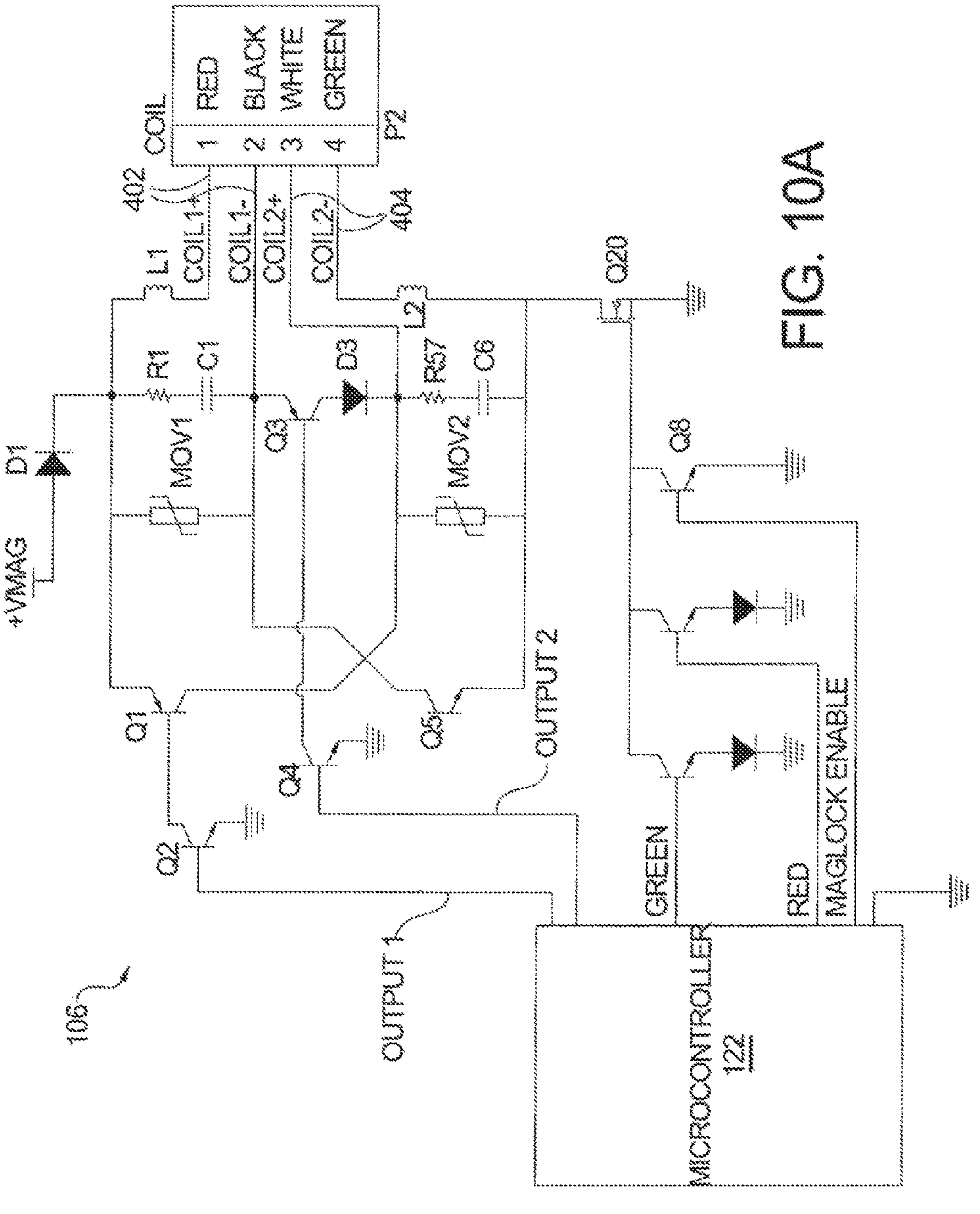
FIG. 10A is a schematic diagram of the switching portion of the circuitry in the schematic diagram of FIG. 9B that illustrates the automatic voltage selection feature of the ACD of the present invention.
Figure 10B:
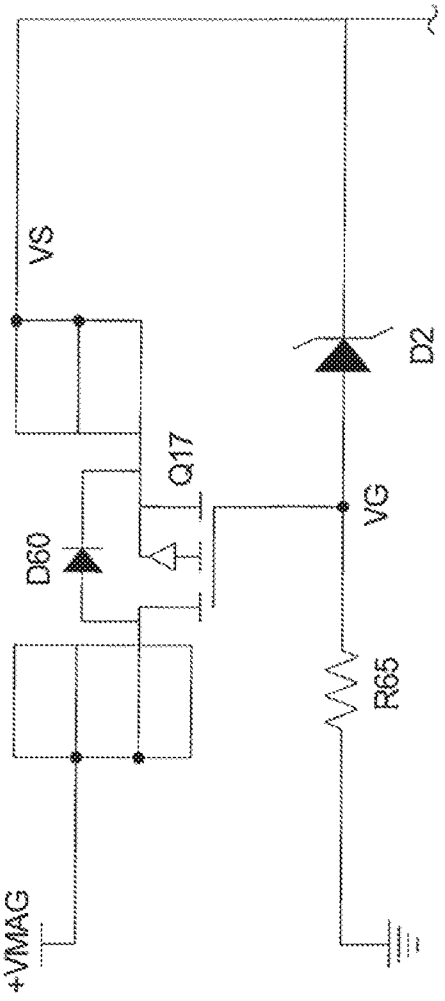
FIG. 10B is a schematic diagram of the switching portion of the circuitry that illustrates the minimized voltage drop feature with diode D1 of FIG. 10A being replaced with the circuitry of FIG. 10B.

Having described the operation and features of the present invention, the exemplary circuitry that enables the described embodiment will be described next with reference to FIG. 9 and FIGS. 9A-9D and, focusing on switching circuit 106 of ACD circuit 300 as shown in FIG. 9B, FIGS. 10A and 10B.

The first feature that will be described relates to one aspect of the present invention that addresses the problem of dealing with input voltage levels which may be one of two values for the installation of ACD 100. As previously stated, traditional environments for ACD 100 consist of two input voltage ratings, 12 or 24 volts DC. FIG. 10A illustrates a voltage selection and switching circuit 106 that may be implemented to analyze the applied voltage and automatically configure the circuitry for a pair of coils to handle and match the applied incoming voltage. Importantly, the selection is implemented by the microcontroller 122. Circuit 106 comprises among other components, a supply voltage Vmag, microcontroller output 1, microcontroller output 2, two identical coils 402, 404, and transistors Q1, Q2, Q3, Q4 and Q5.

Transistors Q1 and Q5 are connected to Output1 of the controller to thereby be switched by the logic high and logic low signals of Output1. Transistor Q2 is provided in circuit 106 to isolate microcontroller 122 (FIG. 1) from the high-side driver transistor Q1. Transistor Q4 is connected to Output2. Coil 402 is defined across the RLC circuit comprising resistor R1, capacitor C1 and inductor L1. Coil 404 is defined across the RLC circuit comprising resistor R57, C6 and L2. In operation, the output signals from the microcontroller Output1, Output2 turn on or off appropriately connected transistors to thereby place the coils 402, 404 in either serial or parallel operation, in response to the applied voltage.

As best seen in FIG. 10A, in the case of the 12 volt mode of operation (i.e., when the voltage applied to system and sensed by microcontroller 122 is approximately 12 volts), microcontroller 122 provides a logic high on output1 and a logic low on output2. In effect, the logic high on Output1, turns on transistor Q2, which turns on transistor Q1. Transistor Q5 is also turned on by the output1 signal. The logic low on Output2 turns off transistor Q4 which turns off transistor Q3 as well. The effect of this state of the transistors (Q3—off, Q4—off, Q5—on, and Q1—on) results in current flow from Vmag via diode D1 being split on one path through transistor Q1 and through inductor L2 to ground and split on the other path through Inductor L1 and then through transistor Q5 to ground. This current split through both the coils 402, 404 represents a parallel configuration of the coils 402, 404. In a 24 volt mode of operation, microcontroller 122 provides a logic low on Output1 and a logic high on Output2. In effect, the logic low on Output1, turns off transistor Q2, which turns off transistor Q1. Transistor Q5 is also turned off by the logic low signal. The logic high on Output2 turns on transistor Q4 and effectively turns on transistor Q3 as well. With Q1 and Q5 off, and Q3 on, current will flow from Vmag via diode D1 through inductor L1 and then through transistor Q3, diode D3 and inductor L2 to ground, effectively placing the coils 402, 404 in series operation. Two outputs are utilized from the microcontroller 122 since the operations of transistors Q1 and Q5 are inverted from the operation of transistor Q4.

Turning next to FIG. 10B, a switching circuit for minimizing the voltage drop when the circuit of 106 is switched is shown. The portion of the circuit shown in FIG. 10B replaces diode D1 in FIG. 10A. The metal-oxide-semiconductor field-effect transistor ("MOSFET") device shown presents an extremely small resistance from the gate to the source when turned on. Q17 also incorporates a protection diode D60 across the gate to source to prevent a back flow of current into the gate source. A 6.5 v zener diode D2 is also provided in the circuit. In theory, when voltage is applied to Vmag, the voltage is not instantaneous, but ramps from 0 v to the first target voltage of either +12 v or +24 v. Since there is no gate voltage Vg, current will flow through the protection diode D60 to the source node Vs. A voltage drop of 0.7 v will be seen during this time. Note that this voltage drop is unacceptable during normal operation when the coils should be functioning. In accordance with the invention, as Vs begins to ramp to the target voltage of either +12 v or +24 v, a threshold will be reached in which D2 begins to conduct. In order to turn transistor Q17 on, a voltage differential between −2 v and −10 v must be seen between Vg and Vs. Once Vs rises above 6.5 v, the voltage divider created by zener diode D2 and resistor R65 begins to turn on transistor Q17. Max operational current occurs with Vmag at 12 v. At this point, protection diode D60 is not turned on so there is no longer a 0.7 v drop. When voltage is removed from Vmag, the collapsing magnetic field will attempt to create a current flow in the opposite direction back through transistor Q17 into Vmag. Since the field effect transistor is turned off, the protection diode D60 comes into play and prevents current flow.

Turning next to the means for enabling the features and aspects of the present invention, FIG. 9 and FIGS. 9A-9D depict a block diagram of a circuit 300 that may be implemented in ACD 100. The various components of circuit 300 enable and provide the features of the invention that were previously highlighted and described.

The block diagram of circuit 300 depicts a number of connectors mounted on PCB 30—tamper switch connector P7; bond status monitor connector P1; Video in connector P4; Main connector P10; REX signal connector P8; and DPS connector P6. The diagram further depicts connectors Program J2 and PIR IN J1, as well as, a microcontroller 122, a digital display S1 and a voltage selection circuit 106.

In operation, the access control device circuit 300 enables automatic voltage selection and switching, tamper monitoring, passive motion detection, display notification, lock status monitoring, door position monitoring, visual lock status, automatic relock, and video monitoring, along with all of the other features and objects of the invention. As would be appreciated by one skilled in the art, the various components and the interactions described and/or illustrated herein are exemplary and variations on any one or more of them are contemplated and within the scope of the present invention.

A 5 volt DC voltage for driving various components of the circuit is derived from the voltage source VMAG (see FIG. 10A and FIG. 10B) that is provided to power the magnetic lock. The connections to the microcontroller 122 provide the necessary inputs and outputs that tie the physical events, relating to ACD 100, to the programming sequences that effectuate the operational flow and behavior of ACD 100. Tamper switch SW1 is connected to connector P7 to provide a signal in association with the removal of a cover 20 or access panel 22 (FIG. 11) of electromagnetic lock module 14 for ACD 100. Lock bond status monitoring is provided utilizing the bond hall connector P1. Video camera information is provided via connector P4, which is electrically isolated from the microcontroller 122. An additional video output connector is also available for extending or passing along received video signals to a remote monitor. Request to Exit (REX) signal is provided utilizing connector P8. Door position status (DPS) is provided to the system utilizing the connector P6. The digital display S1 provides character display and is driven by the microcontroller 122. In a preferred embodiment, display S1 is adapted to comprise multiple ports which correspond to signals representing 5 seconds, 10 seconds, 20 seconds, Automatic Relock disable, and Local PIR disable, respectively. The passive motion detector (PIR) is connected to the microcontroller 122 via switch J1 to thereby provide input signals corresponding to the detection or non-detection of an object.

Circuit 300 has two ranges of operation, namely a low voltage range and a high voltage range. In one embodiment the low voltage range (12 volt mode) is characterized by an input voltage in the range of approximately 10.5 volts to just less than 21 volts. The high voltage range (24 volt mode) is characterized by voltages ranging between 21 volts and 36 volts.

The voltage selection circuit 106 is connected to Coil connector P2 to provide appropriate configuration and connectivity to Coil 1 and Coil 2, which are identically sized. As previously described, the configuration and connectivity of Coil 1 and Coil 2 implements automatic voltage selection by providing serial or parallel connection configurations of the combined coils. The configuration implemented by the sequence of signals from the microcontroller 122 and the placement of the various transistors Q1, Q2, Q3, Q4 and Q5, is determined by the voltage that is connected to the electromagnetic lock of ACD 100 and sensed by the microcontroller 122. In a particular embodiment, ports of microcontroller 122 may be utilized to provide sensing of the voltage that is applied to ACD 100. In one embodiment of the present invention, a voltage divider is utilized to provide voltage to such ports. In another embodiment, a current monitoring resistor could be placed in line to measure the current that is drawn by the coils and hence deduce the applied voltage for automated switching/selection. Additional ports of the microcontroller 122 provide the necessary output signals that determine the on/off states of the transistors Q1, Q2, Q3, Q4 and Q5 in the voltage selection circuit. A couple of varistors MOV1 and MOV2 are introduced in circuit 402 across the RC circuit for each coil. The varistors MOV1, MOV2 serve to shunt current created by a high voltage and thereby protect the sensitive components of circuit 300.

In one aspect of the present invention, ACD 100 allows a user to connect an unfiltered rectified AC power supply to the system. This would ordinarily result in the above described selection circuit switching between 12 and 24 volt modes with the rising and falling of the AC sine wave. To address this issue, the system of the present invention implements a peak and hold detection circuit that would sample the incoming AC wave and hold the peak voltage of the wave. The peak and hold detection circuit would then control the switching transistors Q1-Q5, instead of the transistors being controlled directly off of VCC.

Electromagnetic lock module 14 may be powered or not powered from the microcontroller 122. In operation, a high signal serves to turn on transistor Q8, which in turn turns on the field-effect transistor (FET) switch Q20. The "on" status of switch Q20 enables the completion of the coil circuit, i.e., connection of the negative terminal of coil 2 on connector P2 to ground. A low signal effectively turns off the FET switch Q20 thereby opening the coil circuit.

Another aspect of the present invention relates to the physical attributes of electromagnetic lock module 14. As previously mentioned, one drawback of existing electromagnetic locks is that they protrude vertically in a downward direction into the door opening. The physical positioning and profile of these existing locks could become a safety, convenience and aesthetic issue. In order to overcome these drawbacks, electromagnetic lock module 14 has been horizontally lengthened and vertically shortened to maintain the same face area but with a reduced height as best seen in FIG. 11A-G. One model of the electromagnetic lock provides space for mounting the PIR and video camera units on the side of the unit. Another model, which provides lower holding force due to a shortened length, provides mounting for the PIR and video camera at the ends of the electromagnetic lock. When handing is taken into account, these units can be switched to provide optimal locations for each device. Module 14 may include a cover 20 that operates to at least partially enclose the components that make up module 14. Cover 20 may include an access panel 22 that provides access to the components contained within module 14. Moreover, access panel 22 may be removable so that different control panels can be interchanged to accommodate the features of a particular module 14. For example, access panel 22 shown in FIG. 11A includes apertures 24, 26 configured to accommodate an optional CCTV camera 104 and/or a PIR 108, respectively.

Figure 11B:
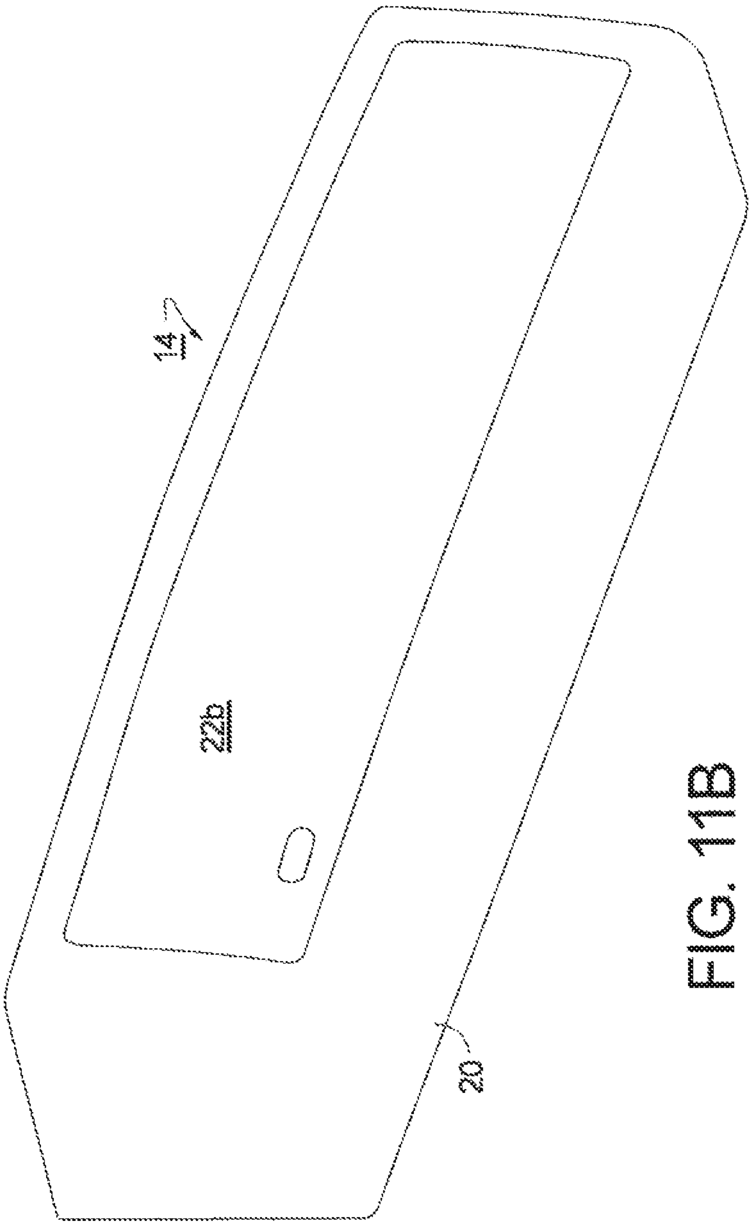
FIG. 11B is an illustration of an alternative cover for the electromagnetic lock module shown in FIG. 11A without including any accessory options.
Figure 11C:
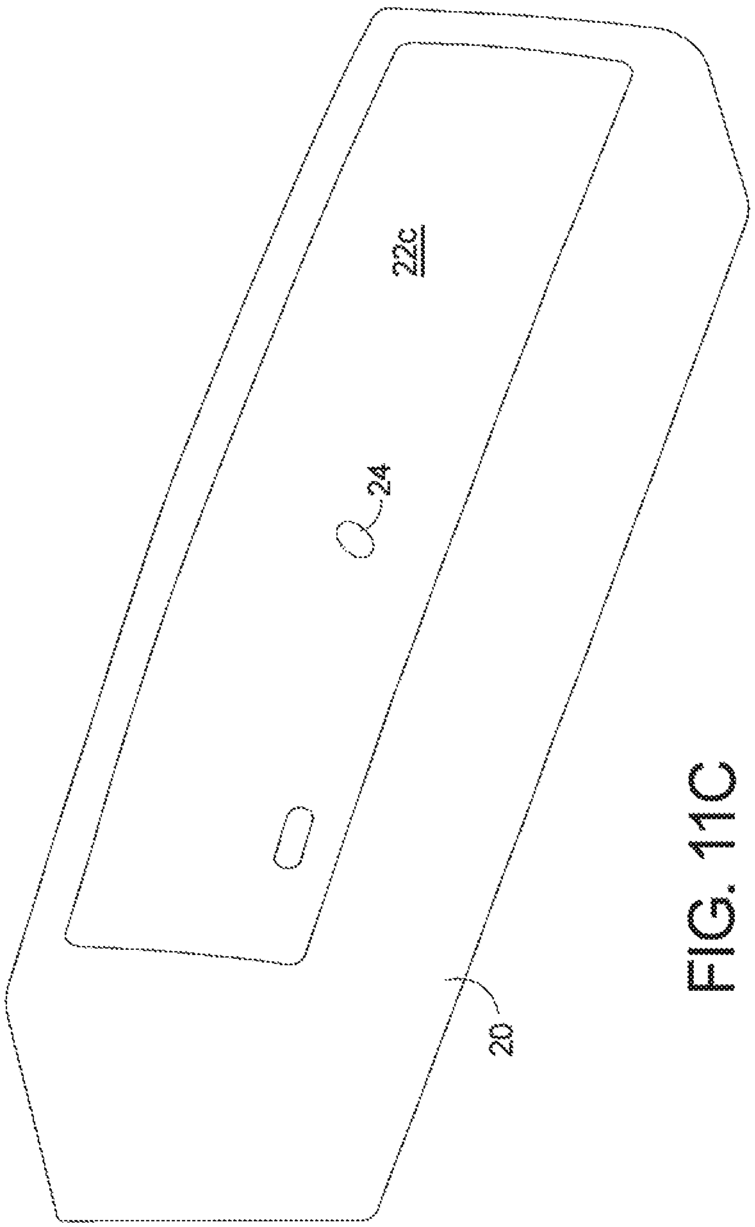
FIG. 11C is an illustration of another alternative cover for the electromagnetic lock module shown in FIG. 11A including an opening for a CCTV camera.
Figure 11D:
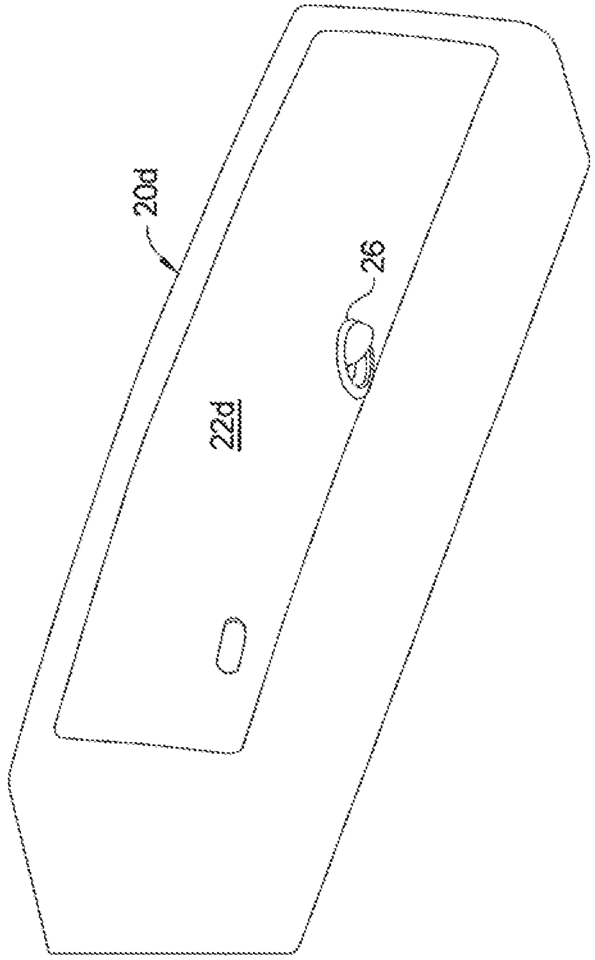
FIG. 11D is an illustration of another alternative cover for the electromagnetic lock module shown in FIG. 11A including an opening for a PIR.
Figure 11E:
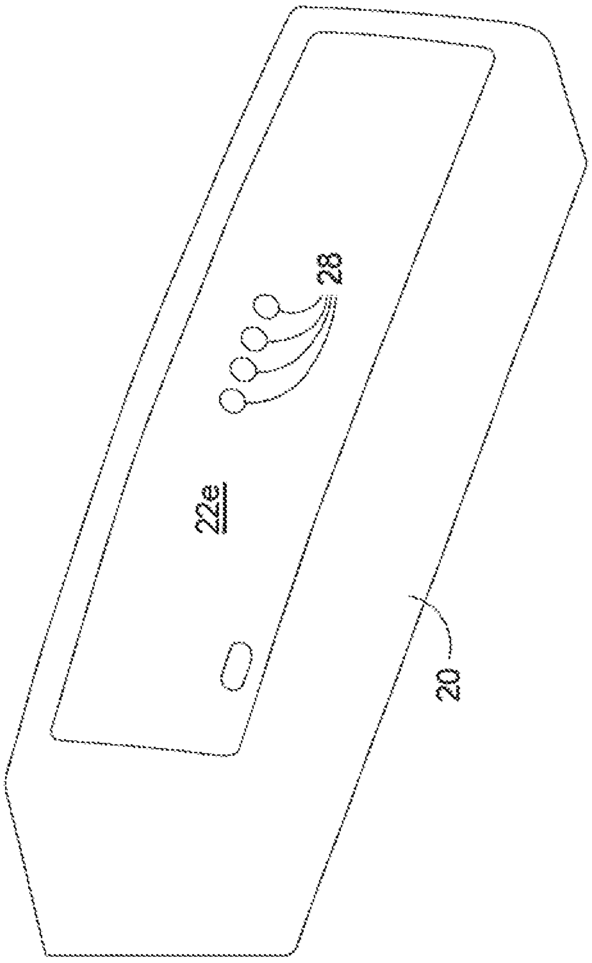
FIG. 11E is an illustration of another alternative cover for the electromagnetic lock module shown in FIG. 11A including one or more openings for a sound generation device.
Figure 11F:
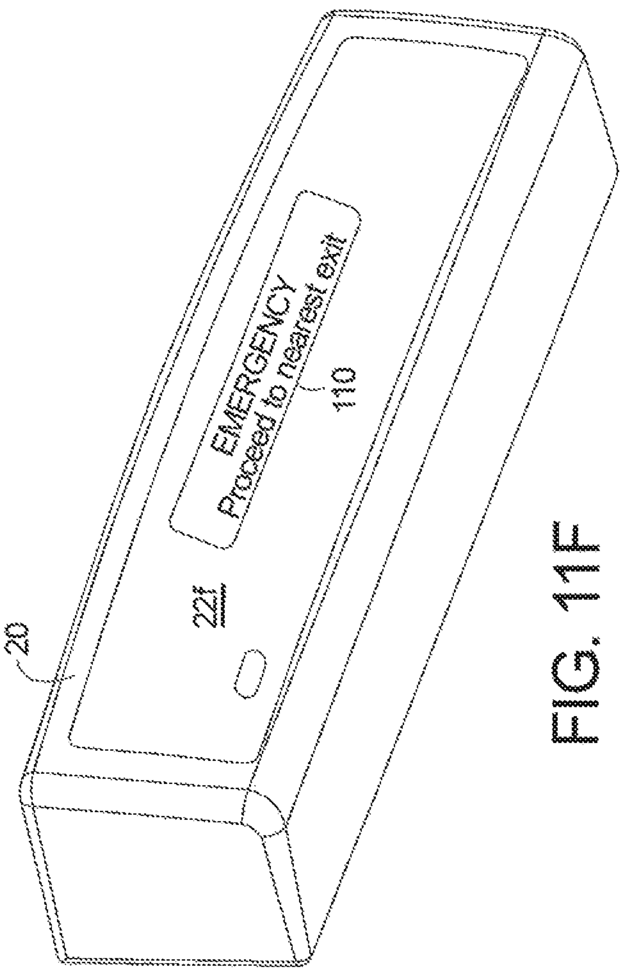
FIG. 11F is an illustration of another alternative access panel for the electromagnetic lock module shown in FIG. 11A including a digital display to communicate the status of the door and other information to a person on the interior side of the door.
Figure 11G:
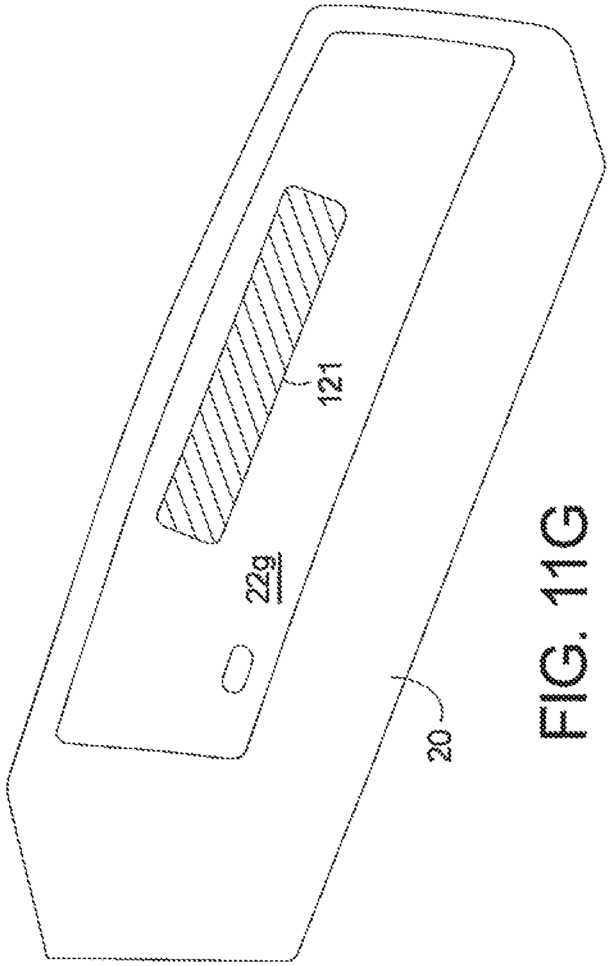
FIG. 11G is an illustration of another alternative access panel for the electromagnetic lock module shown in FIG. 11A including one or more static or strobe lights.

FIGS. 11B-11E provide additional examples of different covers and/or access panels that can be used with electromagnetic lock module 14. FIG. 11B is an illustration of an alternative access panel 22*b* for the electromagnetic lock module shown in FIG. 11A without including any accessory options. FIG. 11C is an illustration of another alternative access panel 22*c* for the electromagnetic lock module shown in FIG. 11A including just an opening 24 for a CCTV camera 104. FIG. 11D is an illustration of another alternative access panel 22*d* for the electromagnetic lock module shown in FIG. 11A including an opening 26 for PIR 108. FIG. 11E is an illustration of another alternative access panel 22*e* for the electromagnetic lock module shown in FIG. 11A including one or more openings 28 for a sound generation device 119. FIG. 11F is an illustration of another alternative access panel 22*f* for the electromagnetic lock module shown in FIG. 11A including digital display 110 to communicate the status of the door and other information to a person. FIG. 11G is an illustration of another alternative access panel 22*g* for the electromagnetic lock module shown in FIG. 11A including one or more static or strobe lights 121. Other types of covers and/or access panels are also contemplated herein and within the scope of the present invention.

Figure 12:
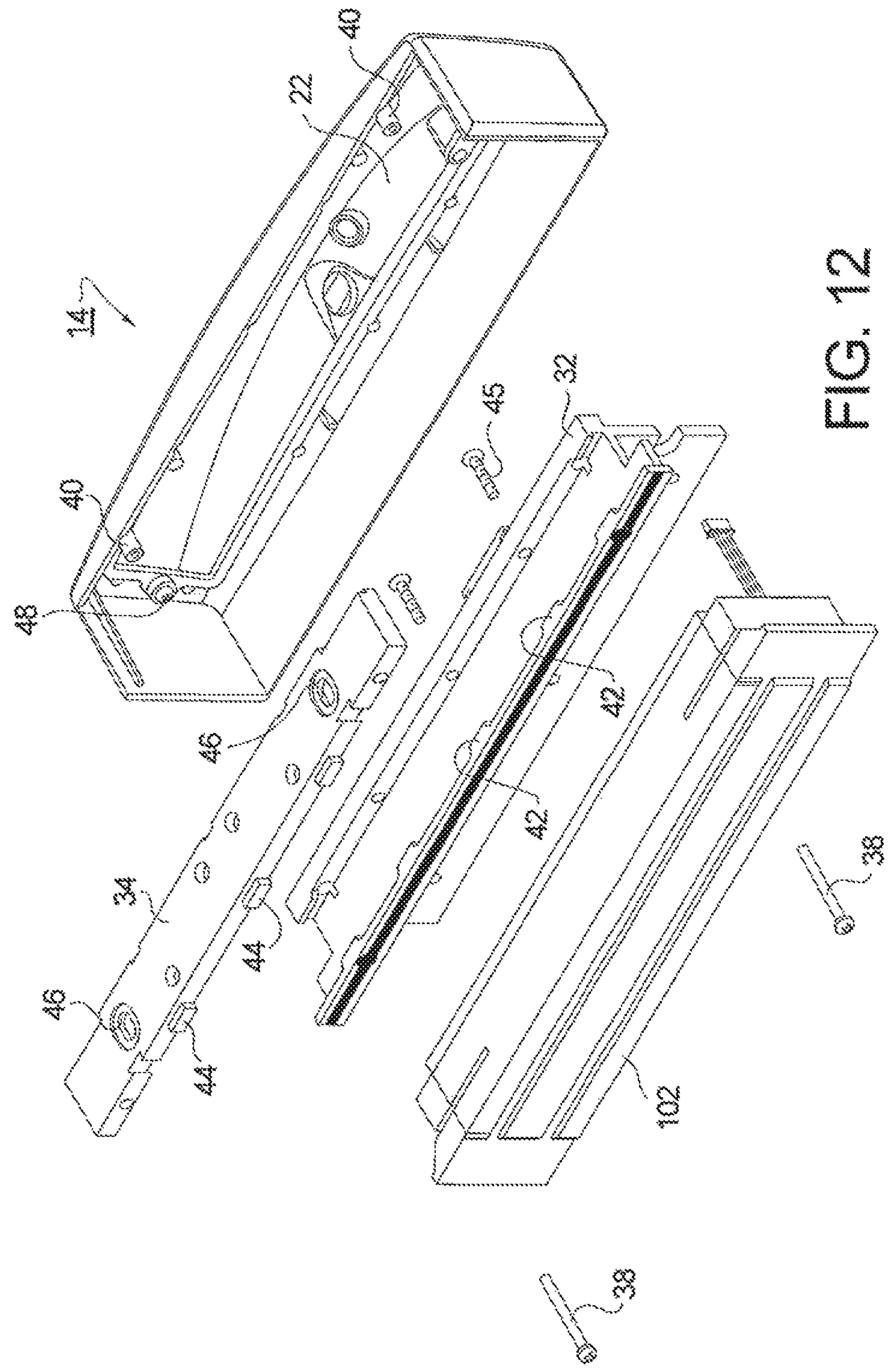
FIG. 12 generally illustrates an exploded view of the electromagnetic lock module shown in FIG. 11A.
Figure 13:
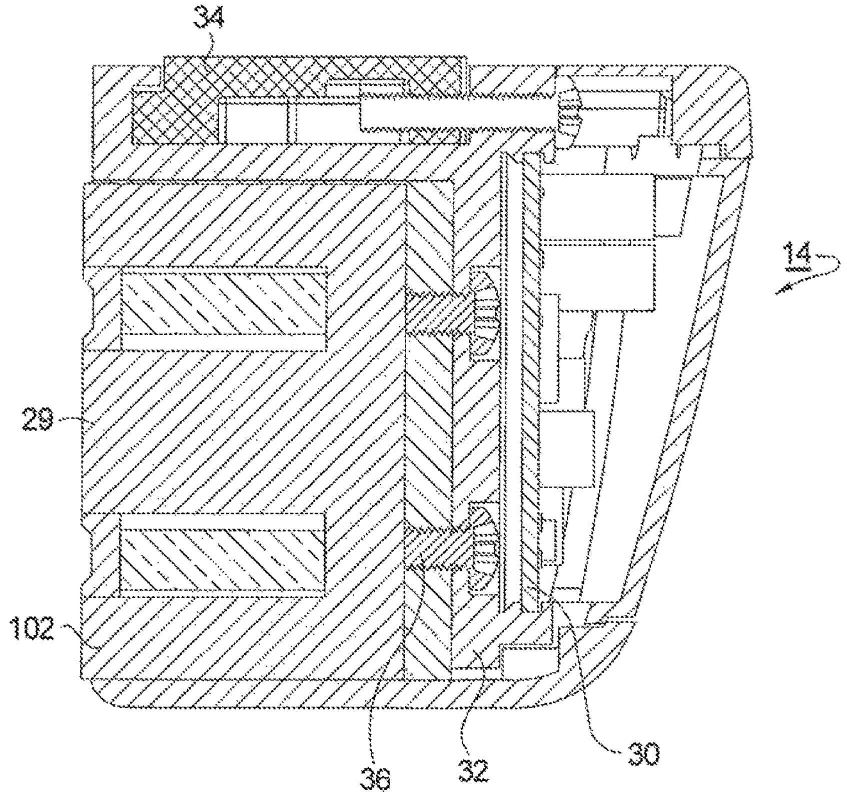
FIG. 13 is a cross-sectional view of the electromagnetic lock module taken along line 13-13 in FIG. 11A.
Figure 14:
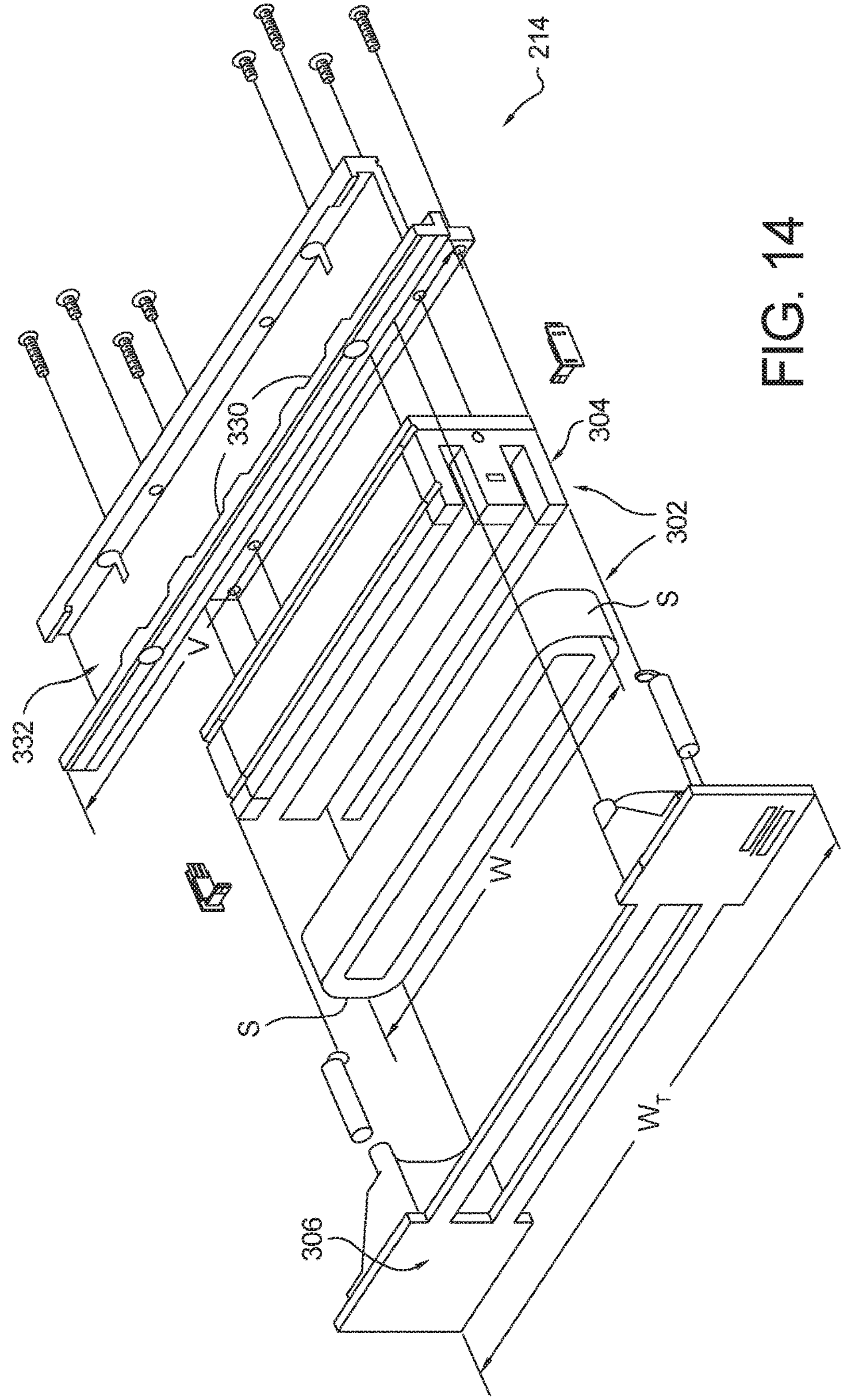
FIG. 14 is an exploded view of a shorter length, lower holding force electromagnetic lock showing the Lock face/Coil retainer which could be substituted for the potting in FIG. 13.

As best seen in FIGS. 12 and 13, one embodiment of electromagnetic lock module 14 generally includes electromagnet 102 including a E-shaped core, PCB 30 operably and physically connected to electromagnet 102 and configured to perform the operations and methods as previously described above, including, but not limited to, locking and unlocking door 10 to door frame 12. In accordance with another aspect of the present invention, electromagnetic lock module 14 may further include an L-shaped mounting bracket 32 and a mounting plate 34 that are used in conjunction to securely fasten electromagnetic lock module 14 to door frame 12. In particular, mounting bracket 32 is configured for being securely coupled with E-shaped core 29 of electromagnet 102 using one or more fasteners 36. Mounting bracket 32 has been designed as an "L" shape to provide more strength and stability to electromagnetic lock module 14. Mounting bracket 32 is particularly important when door 10 slams shut in door frame 12 creating an impact between electromagnet 102, which is attached to door frame 12 and keeper plate 16 which is attached to door 10. Mounting bracket 32 may be further connected to cover 20 by passing one or more fasteners 38 through holes formed in mounting bracket 32 and receiving holes 40 formed on cover 20. Mounting bracket 32 further defines a series of spaced apart channels 42 that are configured for securely receiving a corresponding number of protrusions 44 extending from mounting plate 34 to assist with fixedly positioning mounting bracket 32 relative to mounting plate 34 along with fasteners 45 that secure bracket 32 to plate 34. Prior to being engaged with mounting bracket 32, mounting plate 34 is securely mounted to door frame 12 using one or more fasteners that pass through a corresponding number of holes 46 defined therein. Furthermore, as best seen in FIG. 12, one or more fasteners 48 may be used to secure access panel 22 to cover 20. The electromagnetic lock module 14 in accordance with the present invention is capable of being securely mounted to door frame 12, which provides for a reliable and robust ACD 100 for a door.

Where a reduced strength of the electromagnetic lock is possible because of its application, a shorter version of the electromagnetic lock could be provided. Referring now to FIG. 14, a portion of electromagnetic lock module 214 having its length specifically sized to match the desired strength of the magnet is shown. The portion shown of electromagnetic lock module 214 generally includes electromagnet 302, including an E-shaped core 304. A lock face/coil retainer 306 replaces the polyurethane potting material previously used to finish off the contact face of the electromagnetic lock of FIG. 12. A PCB (not shown in FIG. 14) is operably and physically connected to electromagnet 302 and is configured to perform the operations and methods as previously described above, including, but not limited to, locking and unlocking door 10 to door frame 12. In accordance with the portion of embodiment 214 shown in FIG. 14, the electromagnetic lock module may further include a mounting bracket 332 used to securely fasten electromagnetic lock module 214 to door frame 12. Mounting bracket 332 having a longitudinal width V further defines a series of spaced apart channels 330 to assist with fixedly positioning mounting bracket 332 relative to a mounting plate (not shown). Of particular note, the width W of electromagnet 302 may be considerably shorter that the width of electromagnet 102 shown in FIG. 12. Thus, a cavity R is provided on either side S of the electromagnet and within total width $W_T$ of lock face retainer 306 (FIG. 15B) to mount an optional PIR module or camera module in compact electromagnetic lock module 214.

Figure 15A:
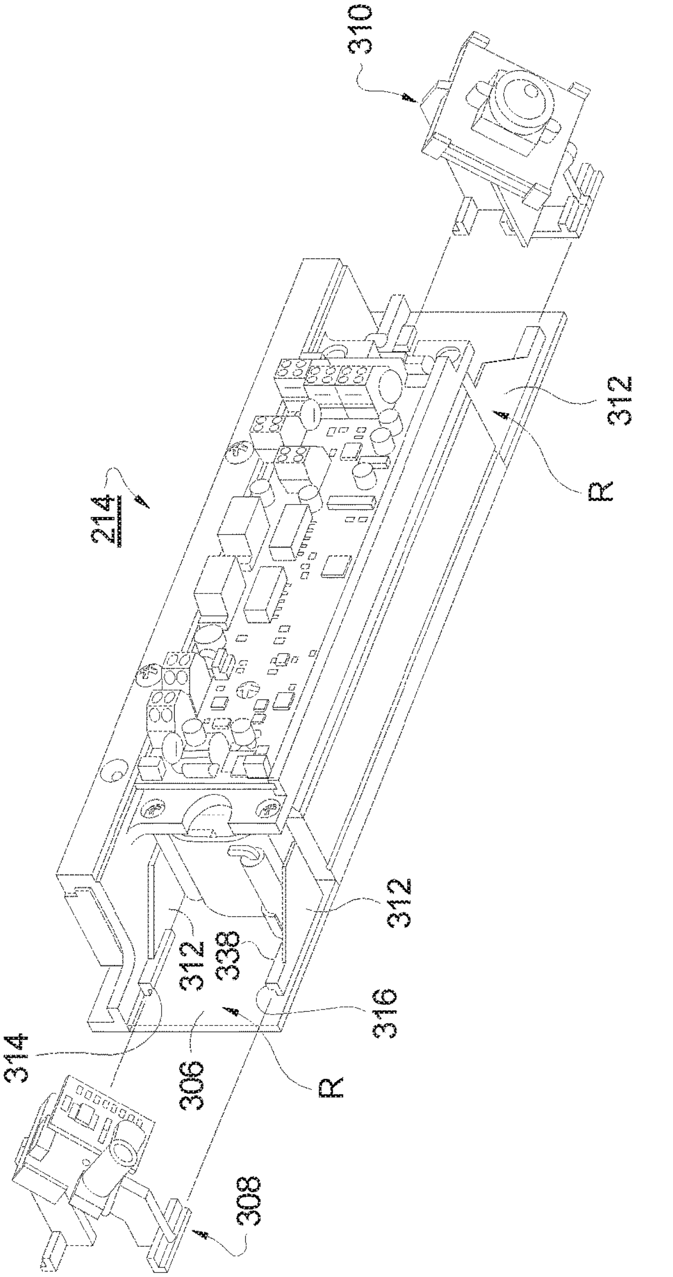
FIGS. 15A and 15B show the shorter electromagnetic lock with repositionable PIR and camera modules and how they may be swapped from one end to the other of the device depending on handing requirements.
Figure 15B:
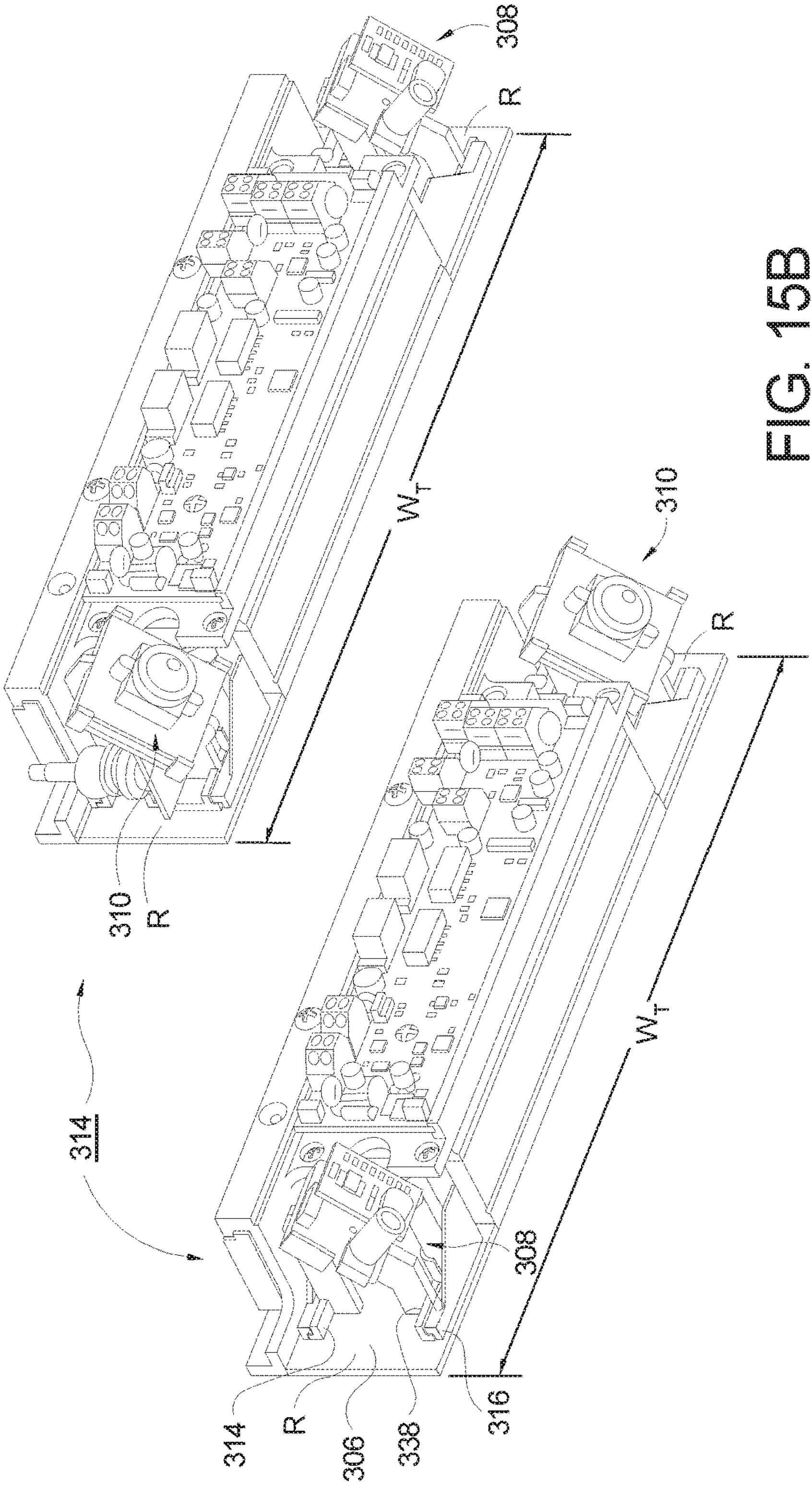
Figure 15C:
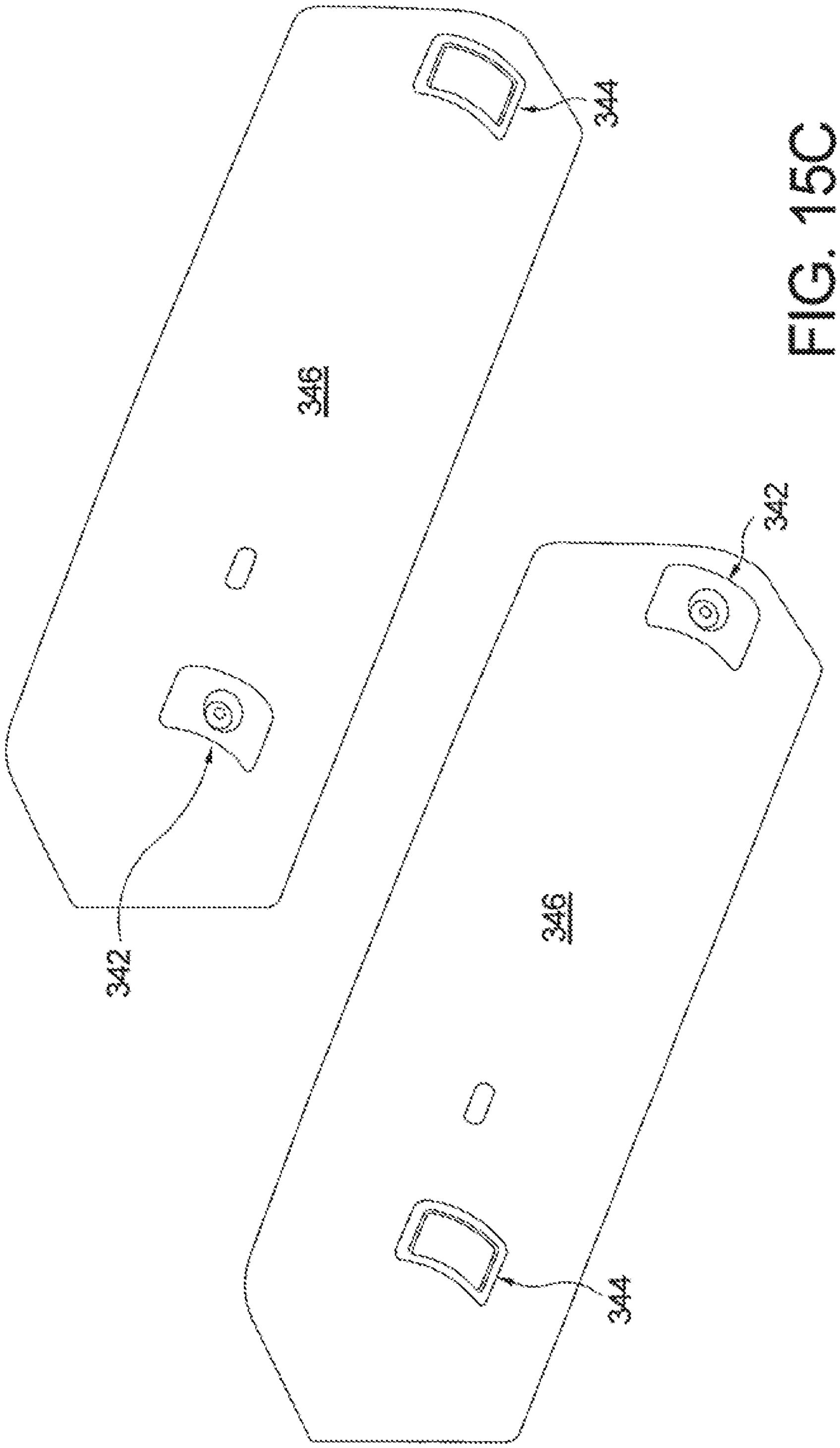
FIG. 15C shows the cover for the shorter electromagnetic lock with interchangeable PIR and camera inserts.
Figure 15D:
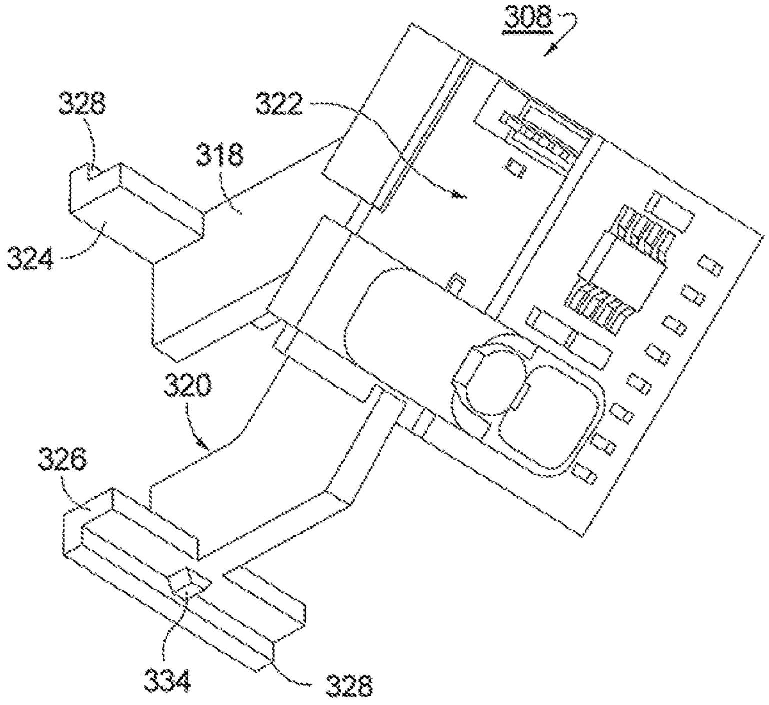
FIG. 15D shows a PIR module that could be used in the shorter electromagnetic lock.

FIGS. 15A, 15B and 15D depict the PIR 308 and camera 310 modules which could be attached within cavity R at either end side S of the electromagnetic lock 214 (FIG. 15B), along with the mounting hardware. Receiving rails 312, each including a pair of grooved channels 314, 316 are provided on both sides S of the assembled electromagnetic module shown in FIGS. 15A and 15B and within cavity R. The receiving rails may be fixed to lock face retainer 306. Referring to FIG. 15D, PIR module 308 is shown depicting details of the module bracket used on either a PIR module or camera module. Module 308 includes bracket legs 318, 320 extending from the PIR/camera interface 322 for supporting the PIR or camera. Connecting rails 324, 326 are disposed at the ends of the legs, the connecting rails having grooves 328 contoured to interlock with the channels of receiving rails 312 so that, when modules 308, 310 are slid from the side of receiving rails 312 as shown in FIG. 15A, the modules are held in place. Appendages 334 are formed in lower rails 316 of the modules so that, when seated in mating notches 338, the modules are held laterally in place. Note that connectors are provided (not shown) to electrically connect the modules to the PCB. Referring to FIG. 15B, it can be seen that the flexibility of this design provides for interchangeability or positions for the PIR and camera where the PIR or camera can be located on either side of module 214, where only one of a PIR or camera can be used, or in a basic model, neither a PIR or camera is used. FIG. 15C shows how either a camera inset 342, PIR insert 344 or no insert can be incorporated in universal cover 346.

Thus, as can readily be seen in FIGS. 14 through 15D, electromagnetic module provides for not only a compact design that is particularly sized to match the magnetic strength requirements of the particular application, the module provides the flexibility to accommodate particular camera and PIR needs within one design package.

A common problem faced in the field when installing an electromagnetic lock is in obtaining a proper and accurate measurement for mounting the electromagnetic lock to the door frame to achieve a proper and secure installation to the frame, and in obtaining a proper and accurate measurement for mounting the armature plate to the door to achieve a proper and secure installation to the door, since a proper alignment between the lock and armature is essential for the electromagnetic lock to operate at its maximum holding force. This task requires that a significant amount of time and energy be invested by even a skilled installer. Another common problem that exists in the field relates to securing of the electromagnetic lock to a typical metal (steel sheet metal or extruded aluminum) door frame. Some manufacturers design their electromagnetic locks to be fastened to the metal frame by a series of sheet metal screws or self-tapping screws which may become loosened over time by the continual dynamic slamming of the door to the door frame. This may become a concern since the 2 to 4 pound electromagnetic lock may become entirely dislodged from the frame, possibly causing a safety hazard to a person walking through the door. Other manufacturers have designed their electromagnetic locks to be fastened to the metal frame by the use of blind-nuts at each corner of the lock. This type of installation requires precise drilling to assure that each of the four attaching screws align with and can be threaded into the blind nuts. For a professional installer, both of these mounting methods require skill and time to achieve a safe and properly functioning electromagnetic lock, door and frame. For a novice installer, the lack of skill and accuracy may lead to a poorly installed electromagnetic lock, an unsecure application and/or a safety hazard. The present invention includes an improved method for quickly and accurately obtaining the proper measurements for securing the electromagnetic lock to the frame and for securing the mating armature plate to the door by using removable spacing tabs located on the mounting bracket of the lock and an armature mounting alignment tool. The present invention also incorporates a unique combination of mounting hardware, including two blind-nuts along with a series of threaded machine screws to provide a secure mounting. The present invention further includes adjustable oblong spacing holes in the mounting bracket for the initial two blind-nuts so that fine tuning of the alignment of the mounting bracket of the lock to the door frame may be made to obtain a proper spacing to the mating door.

This further aspect of the present invention relating to a system and method for installing electromagnetic lock module 14 to door frame 12 is explained by way of an example provided in the sequence of FIGS. 16-32 and described below. Note that the details provided below should not be viewed as the only way to install electromagnetic lock module 14, as the inventive concepts may be implemented in any number of ways and still achieve the advantages provided herein.

Figure 16:
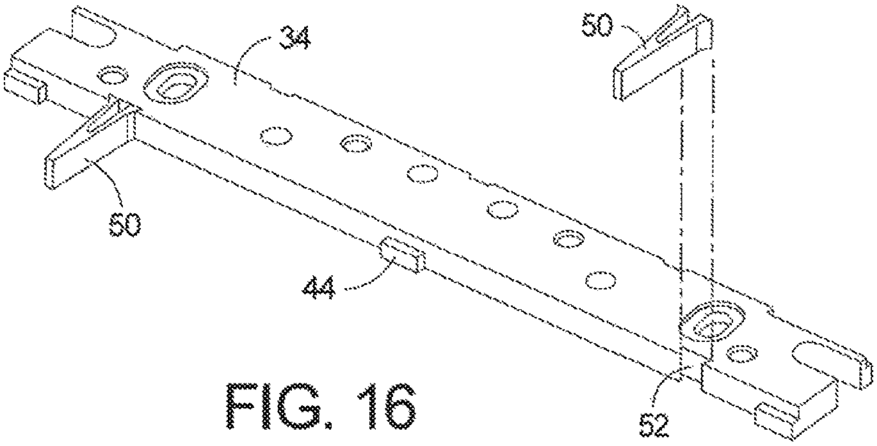
FIGS. 16-32 are a series of drawings illustrating an exemplary embodiment of how to install the electromagnetic lock module on a door frame, in accordance with the invention.
Figure 17:
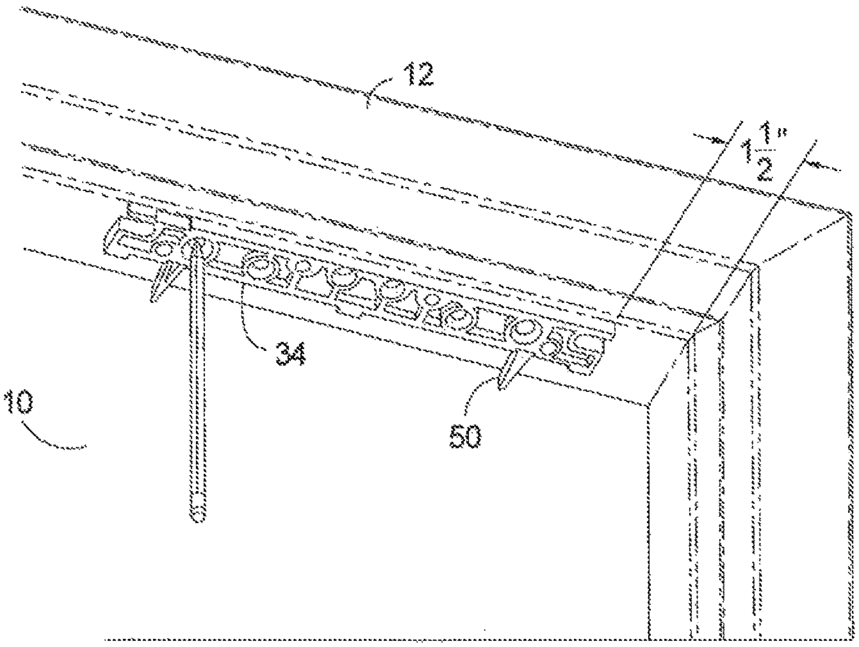

The several new installation concepts incorporated into electromagnetic lock module 14 include a self-templating mounting plate 34 which uses disposable bracket spacers 50 for locating mounting plate 34 on door frame 12 at the correct distance from the inside face of door 10. As best seen in FIG. 16, the first step is to pinch and insert spacers 50 flush into dovetail slots 52 defined in mounting plate 34. As best seen in FIG. 17, the next step is to place mounting plate 34 on the door frame stop with spacers 50 against the closed door 10. With additional reference to FIG. 18, the two oblong bracket mounting holes 54 and the desired end slot(s) 58 should then be marked so they can be drilled for wire access. A one and one-half inch clearance should be maintained from the door frame 14 edge to provide for installation/removal of the electromagnetic lock module 14 in either direction. The electromagnetic lock module 14 can accommodate the electrical wiring from either end of mounting plate 34. Duplicate terminal strips are provided at each end of PCB 30 for attaching power and signal wires.

Figure 18:
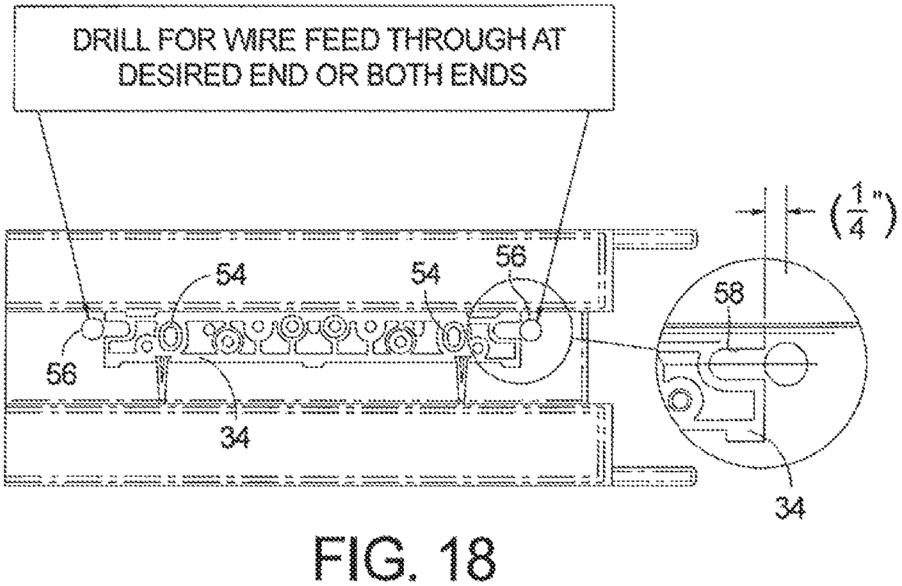
Figure 19:
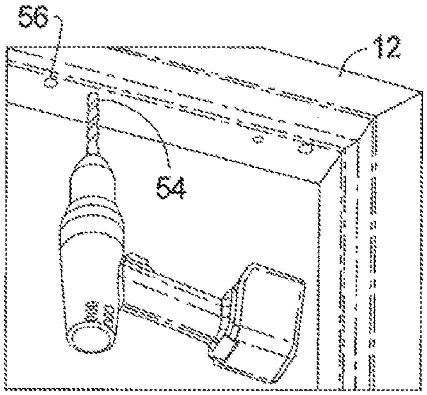
Figure 20:
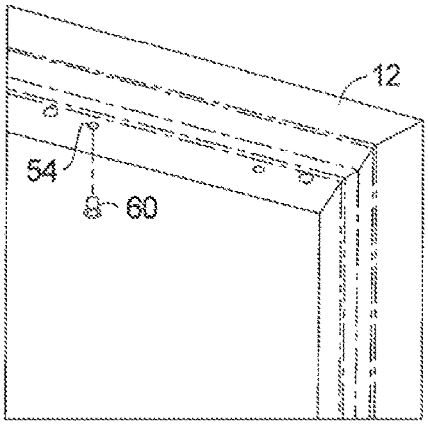
Figure 21:
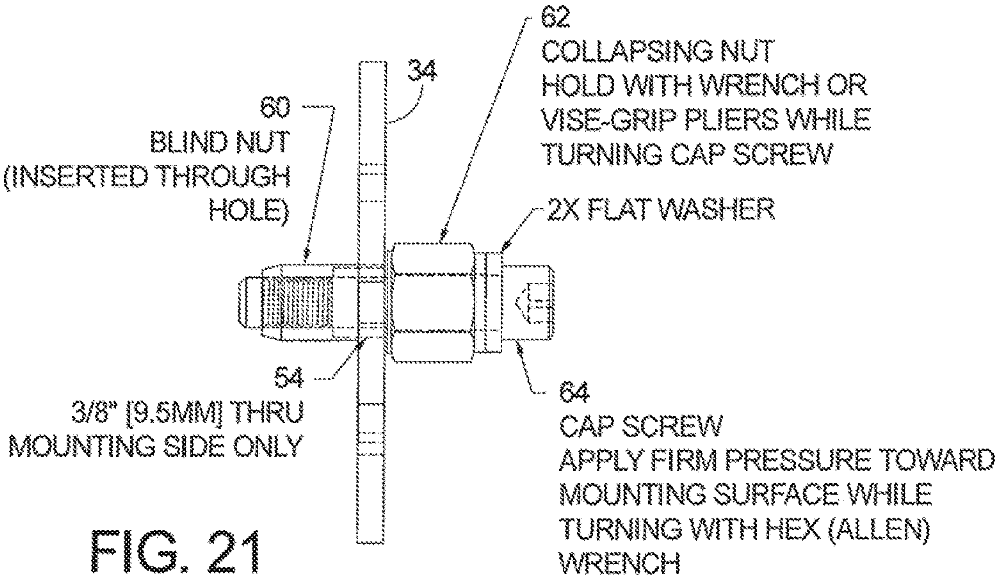

Next, As best seen in FIG. 18, door frame 12 may be marked for desired ½" diameter wire access holes 56. Holes 56 should be aligned with the bracket end slots 58 and tangent to the end of mounting plate 34 as shown. It should be noted that one hole at either end may be used for wire access of standard models. A second hole may be desired for routing cables for camera equipped models. As best seen in FIGS. 19-21, blind nuts are used to simplify mounting for the electromagnetic lock module 14 on door jamb 12. With reference to FIG. 19, two ⅜" diameter holes 54 are drilled at bracket mounting hole marks, and a ½" diameter hole is drilled for each desired wire access hole 56. Blind nuts 60 are then installed in each of the holes 54, 56, as seen in FIGS. 20 and 21, by holding a collapsing nut 62 with a ½" box end wrench. While maintaining pressure toward the mounting surface, a 3/16" hex wrench is used to tighten a cap screw 64 and collapse blind nut 60.

Figure 22:
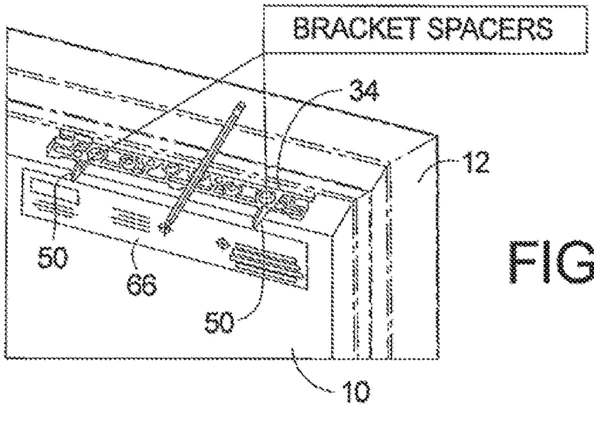
Figure 23:
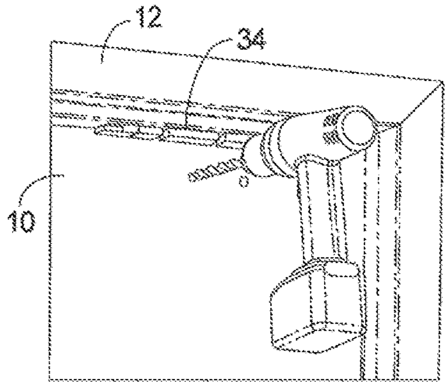

As best seen in FIG. 22, a simple template works in conjunction with mounting plate 34 and spacers 50 to locate the keeper/strike plate 16 on door 10. Specifically, template 66 is placed between bracket spacers 50 and the strike hole locations are marked on the inside surface of door 10. As best seen in FIG. 23, from inside door 10, one ⅜" diameter hole is drilled through door 12 at strike mounting center mark for a hex bolt, and one ⅜" diameter 1 inch deep hole is drilled at the side mark on template 66 for a strike alignment roll pin.

Figure 24:
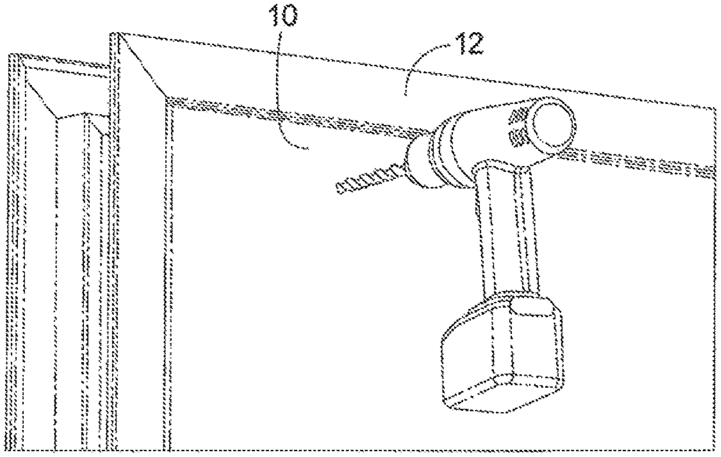
Figure 25:
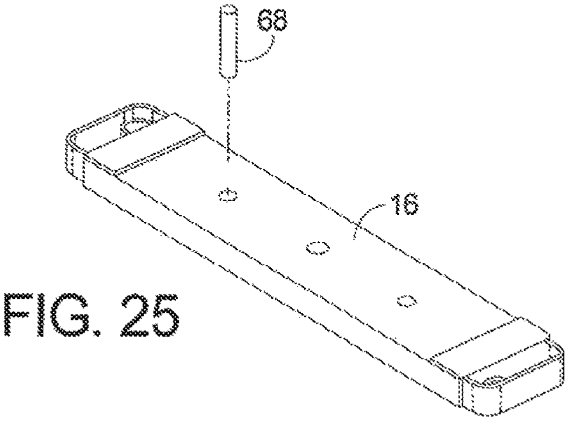
Figure 26:
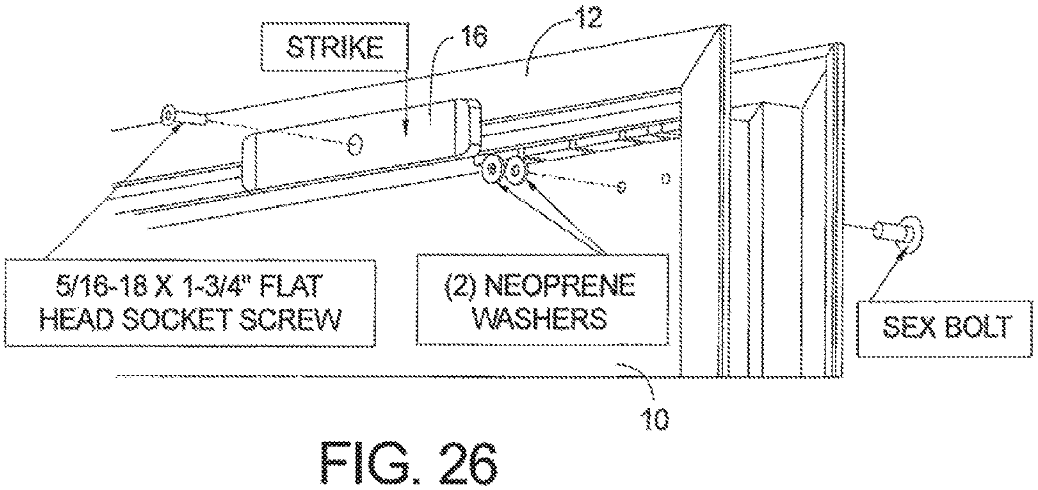

FIGS. 24-26 illustrate the mounting of a simple, single point, anti-swivel keeper plate 16. With reference to FIG. 24, for a hollow metal door, from outside door 10, a ⅜" diameter strike mounting hole is drilled to ½" diameter in the outer wall of door 10 only. For a solid wood door, from outside door 10, a ⅜" diameter strike mounting hole is drilled out to ½" diameter completely through door 10. With reference to FIG. 25, a roll pin 68 is inserted into one of the holes in the back of keeper plate 16 using a hammer if necessary.

FIG. 26 illustrates the installation of keeper plate 16. First, screw, keeper washers, and the hex bolt are assembled through the hole in door 10. A 3/16" hex wrench may be used to tighten the screw into the hex bolt. While tightening, a hammer may be used to periodically tap the head of the hex bolt until the head is seated flush with door 10. It is not recommended to over tighten the assembly. The keeper plate 16 should be permitted to pivot on the neoprene keeper washers for proper function and optimum holding force.

Figure 27:
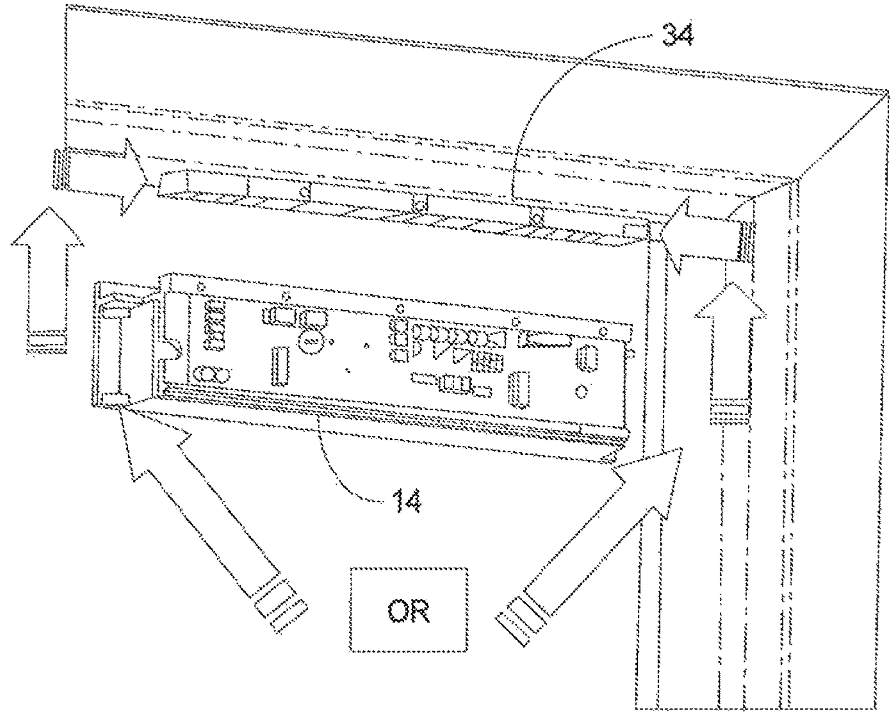
Figure 28:
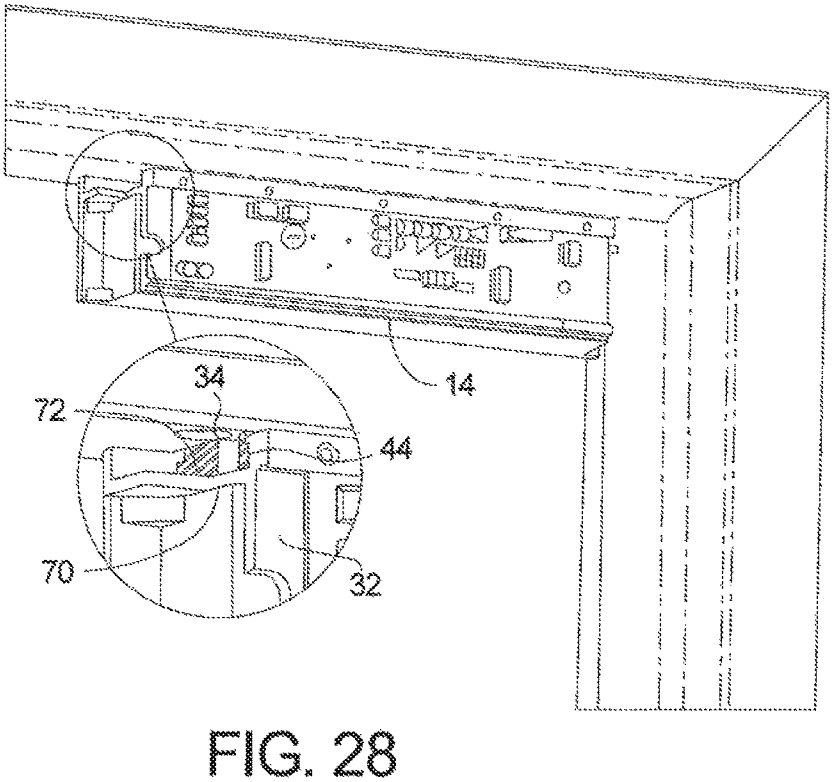
Figure 29:
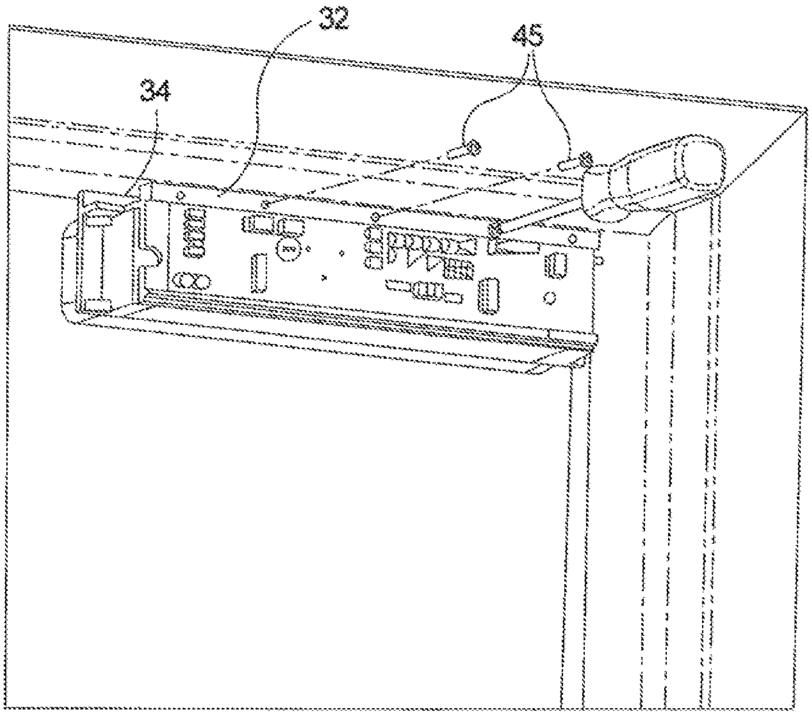

As best seen in FIGS. 27 and 28, electromagnetic lock module 14 may then be engaged with mounting plate 34 by sliding module 14 from either side until protrusions 44 extending from mounting plate 34 are engaged with the channels 42 defined in module 14 (FIGS. 12-13) and module 14 is centered on mounting plate. With particular reference to FIG. 28, module 14 is centered on mounting plate 34 when a notched edge 70 of module 14 is flush with an end 72 of mounting plate 34. As best seen in FIG. 20, one or more fasteners 45 may be used to secure L-shaped plate 32 to mounting bracket 34.

Figure 30:
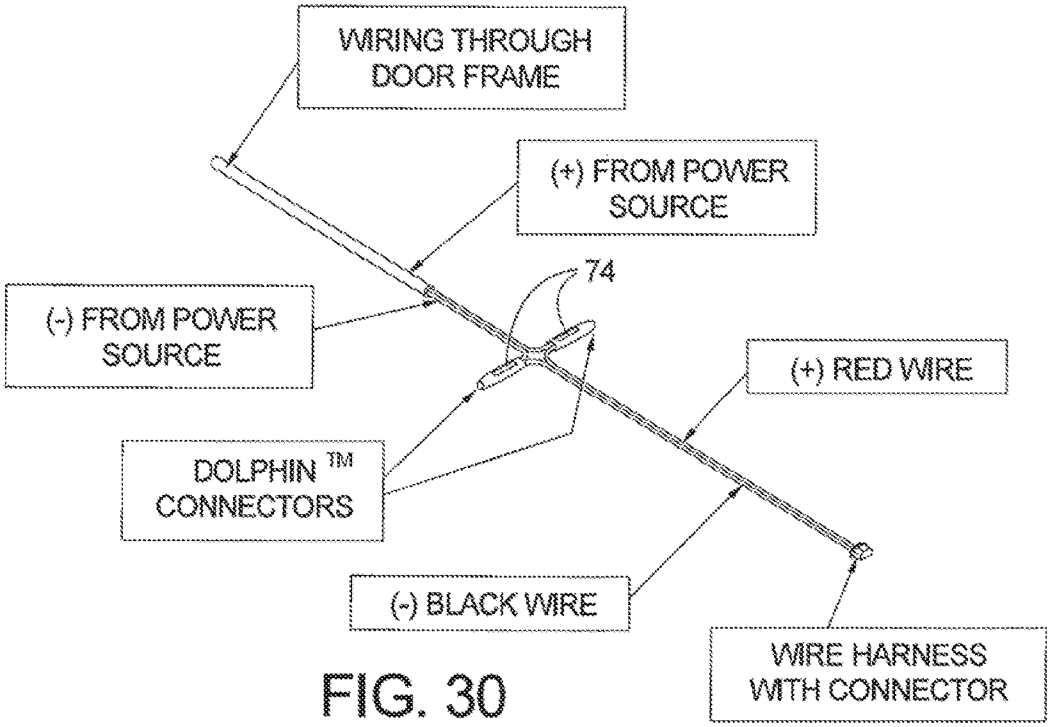
Figure 31:
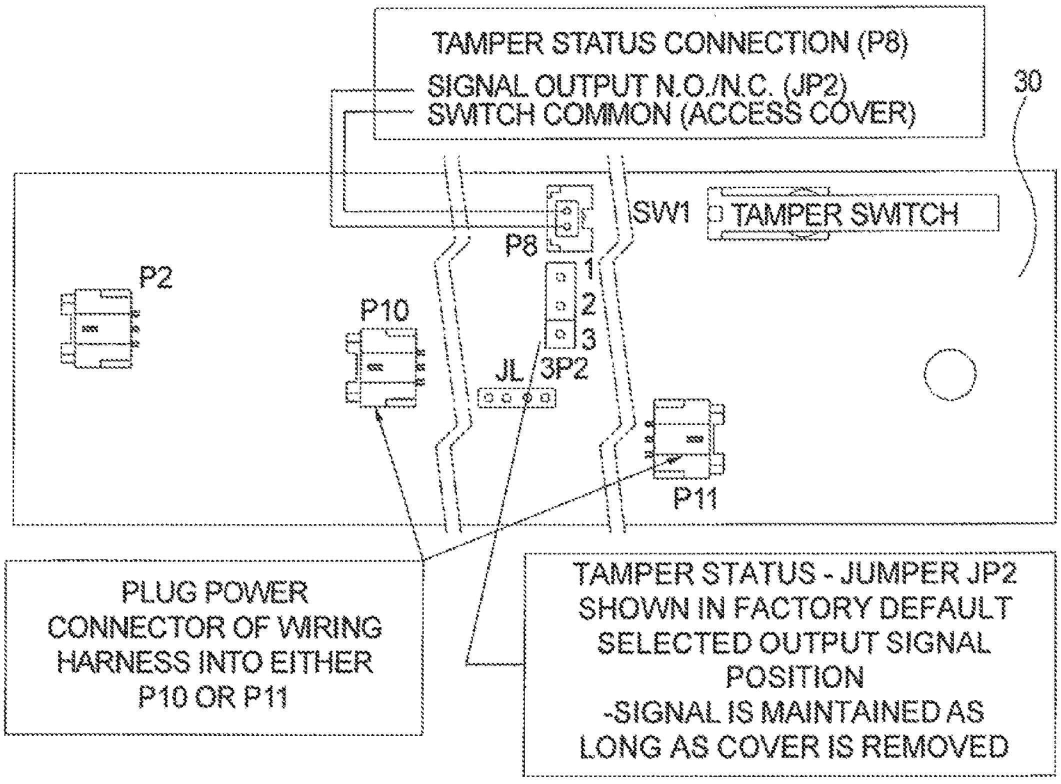
Figure 32:
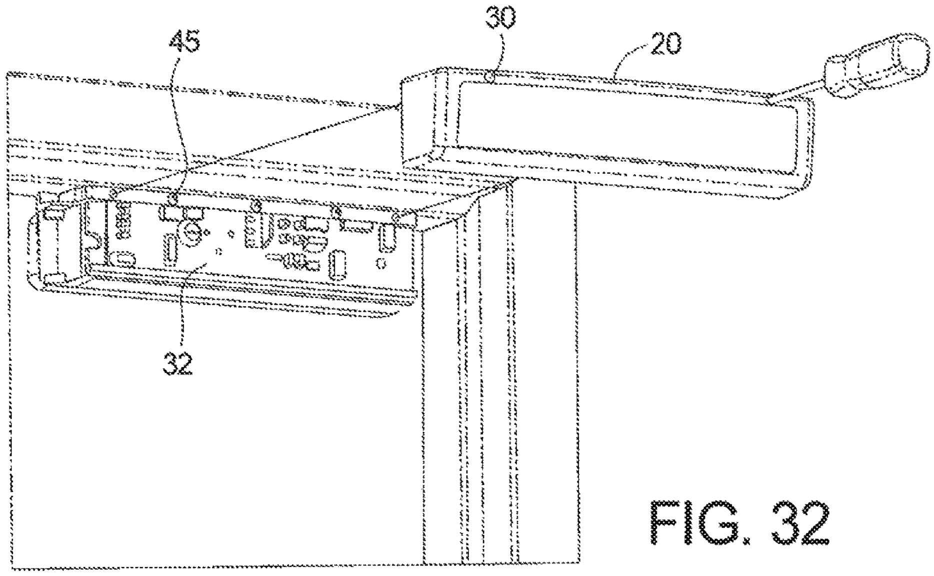

With reference to FIGS. 30 and 31, the required wiring/cable is then pulled through wire feed hole(s) drilled in door frame 12. The necessary connections to the wire harness are then made using electrical connectors 74, such as, for example, DOLPHIN™ connectors. The harness connectors are then plugged into their appropriate headers on PCB 30. The electrical connectors may then be tucked within cover 20 after it is installed using one or more fasteners 38 as shown in FIG. 32.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An electromagnetic lock module for use with an access control device for selectively locking and unlocking a door to a door frame, the electromagnetic lock module configured for being mounted to one of the door and the door frame, the electromagnetic lock module comprising:

an elongate mounting bracket mountable to said one of the door and the door frame;

an electromagnet connected to said elongate mounting bracket, wherein said electromagnet includes a contact face, a first longitudinal width, a first side and a second side;

a lock face connected to said contact face of said electromagnet, wherein said contact face includes a second longitudinal width, and wherein said second longitudinal width is wider than said first longitudinal width of said electromagnet to define a cavity adjacent said first side or said second side of said electromagnet; and a first component module removably attachable to said electromagnetic lock module, wherein said first component module is connected to said lock face and extends away from one of said first side or said second side of said electromagnet, wherein said first component module is removably attached to said electromagnetic lock module and disposed in said cavity in a position adjacent one of said first side or said second side of said electromagnet.

2. The electromagnetic lock of claim 1 further comprising:

a second module removably attachable to said electromagnetic lock, wherein said second module includes a second connecting rail; and a second receiving rail connected to said elongate mounting bracket and extending away from the other of said first side or said second side of said electromagnet, wherein said second connecting rail of said second module is received by said second receiving rail for removably attaching said second module to said electromagnetic lock in a position adjacent said other of said first side or said second side of said electromagnet.

3. The electromagnetic lock of claim 2 wherein said first module is one of a camera module or a passive infrared reader module, and wherein said second module is the other of said camera module or said passive infrared reader module.

4. The electromagnetic lock of claim 1 wherein said first module is one of a camera module or a passive infrared reader module.

5. The electromagnetic lock of claim 4 further including a universal cover connectable to said elongate mounting bracket and configured with an insert for use in association with either said camera module or said passive infrared reader module.

6. An electromagnetic lock for use with an access control device for selectively locking and unlocking a door to a door frame, the electromagnetic lock configured for being mounted to one of the door and the door frame, the electromagnetic lock comprising:

an elongate mounting bracket mountable to said one of the door and the door frame, wherein said elongate mounting bracket has a first longitudinal width;

an electromagnet connected to said elongate mounting bracket, wherein said electromagnet includes a second longitudinal width, a first side and a second side, and wherein said second longitudinal width is sized to fit within said first longitudinal width of said elongate mounting bracket;

a first module removably attachable to said electromagnetic lock, wherein said first module includes a first connecting rail;

a first receiving rail connected to said elongate mounting bracket and extending away from one of said first side or said second side of said electromagnet;

a second module removably attachable to said electromagnetic lock, wherein said second module includes a second connecting rail; and a second receiving rail connected to said elongate mounting bracket and extending away from the other of said first side or said second side of said electromagnet, wherein said first connecting rail of said first module is received by said first receiving rail for removably attaching said first module to said electromagnetic lock in a position adjacent one of said first side or said second side of said electromagnet, and wherein said second connecting rail of said second module is received by said second receiving rail for removably attaching said second module to said electromagnetic lock in a position adjacent said other of said first side or said second side of said electromagnet.

7. The electromagnetic lock of claim 6 wherein said first module is one of a camera module or a passive infrared reader module, and wherein said second module is the other of said camera module or said passive infrared reader module.

8. An electromagnetic lock for use with an access control device for selectively locking and unlocking a door to a door frame, the electromagnetic lock configured for being mounted to one of the door and the door frame, the electromagnetic lock comprising:

an elongate mounting bracket mountable to said one of the door and the door frame, wherein said elongate mounting bracket has a first longitudinal width;

an electromagnet connected to said elongate mounting bracket, wherein said electromagnet includes a second longitudinal width, a first side and a second side, and wherein said second longitudinal width is sized to fit within said first longitudinal width of said elongate mounting bracket;

a first module removably attachable to said electromagnetic lock, wherein said first module includes a first connecting rail, and wherein said first module is one of a camera module or a passive infrared reader module; and a first receiving rail connected to said elongate mounting bracket and extending away from one of said first side or said second side of said electromagnet, wherein said first connecting rail of said first module is received by said first receiving rail for removably attaching said first module to said electromagnetic lock in a position adjacent one of said first side or said second side of said electromagnet.

9. The electromagnetic lock of claim 8 further including a universal cover connectable to said elongate mounting bracket and configured with an insert for use in association with either said camera module or said passive infrared reader module.

* * * * *